United States Patent
Smith et al.

(10) Patent No.: US 12,155,539 B2
(45) Date of Patent: Nov. 26, 2024

(54) ORCHESTRATOR EXECUTION PLANNING USING A DISTRIBUTED LEDGER

(71) Applicant: Intel Corporation, Santa Clara, CA (US)

(72) Inventors: Ned M. Smith, Beaverton, OR (US); Kshitij Arun Doshi, Tempe, AZ (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 883 days.

(21) Appl. No.: 17/028,728

(22) Filed: Sep. 22, 2020

(65) Prior Publication Data
US 2021/0014132 A1    Jan. 14, 2021

(51) Int. Cl.
*H04L 41/5009* (2022.01)
*G06F 9/455* (2018.01)
(Continued)

(52) U.S. Cl.
CPC ...... *H04L 41/5009* (2013.01); *G06F 9/45558* (2013.01); *H04L 9/0643* (2013.01);
(Continued)

(58) Field of Classification Search
CPC ... H04L 41/5009; H04L 9/0643; H04L 41/16; H04L 9/50; H04L 9/3239; H04L 9/3297;
(Continued)

(56) References Cited

U.S. PATENT DOCUMENTS

2015/0264122 A1\* 9/2015 Shau ................. H04L 67/10
                                                          709/203
2019/0132197 A1\* 5/2019 Saxena ............. H04L 41/0895
(Continued)

FOREIGN PATENT DOCUMENTS

CN         114253657          3/2022

OTHER PUBLICATIONS

"Markov decision process", [Online]. Retrieved from the Internet: URL: https: en.wikipedia.org wiki Markov_decision_process, (Jul. 11, 2020), 12 pgs.
"European Application Serial No. 21191525.1, Extended European Search Report mailed May 6, 2022", 7 pgs.
"European Application Serial No. 22216084.8, Response filed Oct. 17, 2023 to Extended European Search Report mailed May 23, 2023", 19 pgs.

*Primary Examiner* — Joe Chacko
(74) *Attorney, Agent, or Firm* — Schwegman Lundberg & Woessner, P.A.

(57) ABSTRACT

Methods, systems, and use cases for orchestrator execution planning using a distributed ledger are discussed, including an orchestration system with memory and at least one processing circuitry coupled to the memory. The processing circuitry is configured to perform operations to generate an execution plan for a workload based on an SLA. The execution plan includes state transitions associated with corresponding edge service instances. A distributed ledger record is retrieved from the ledger based on a reinforcement learning reward value specified by the record. The reward value is associated with a state transition of the plurality of state transitions. An edge node is selected based on the retrieved distributed ledger record. Execution of an edge service instance of the plurality of edge service instances by the edge node is scheduled. The execution of the edge service instance corresponds to the state transition associated with the reinforcement learning reward value.

24 Claims, 13 Drawing Sheets

(51) Int. Cl.
*H04L 9/00* (2022.01)
*H04L 9/06* (2006.01)
*H04L 41/16* (2022.01)

(52) U.S. Cl.
CPC ...... *H04L 41/16* (2013.01); *G06F 2009/4557* (2013.01); *G06F 2009/45595* (2013.01); *H04L 9/50* (2022.05)

(58) Field of Classification Search
CPC ............ H04L 41/5019; G06F 9/45558; G06F 2009/4557; G06F 2009/45595; G06F 9/5072; G06F 9/5077; G06F 2009/45562; G06F 2009/45587
See application file for complete search history.

(56) References Cited

U.S. PATENT DOCUMENTS

| | | | |
|---|---|---|---|
| 2019/0334954 A1* | 10/2019 | Manamohan | H04L 63/0823 |
| 2020/0007414 A1* | 1/2020 | Smith | H04L 41/5006 |
| 2020/0294128 A1* | 9/2020 | Cella | H04L 9/3239 |
| 2020/0374974 A1* | 11/2020 | Sun | H04L 41/20 |
| 2021/0303552 A1* | 9/2021 | Pandey | G06F 16/2379 |
| 2021/0352134 A1* | 11/2021 | Bjontegard | H04W 12/009 |
| 2022/0201047 A1* | 6/2022 | Manamohan | H04L 63/123 |
| 2022/0261295 A1* | 8/2022 | Nagaraja | G06F 18/23 |
| 2022/0271999 A1* | 8/2022 | Jeong | H04L 41/16 |

\* cited by examiner

ORCHESTRATOR EXECUTION PLANNING USING A DISTRIBUTED LEDGER

BACKGROUND

Edge computing, at a general level, refers to the implementation, coordination, and use of computing and resources at locations closer to the "edge" or collection of "edges" of the network. The purpose of this arrangement is to improve the total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use cases that are projected to extensively utilize edge computing include connected self-driving cars, surveillance, Internet of Things (IoT) device data analytics, video encoding and analytics, location-aware services, device sensing in Smart Cities, among many other networks and compute-intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

Several advanced use cases and scenarios occurring at and towards the edge of the network have also introduced a number of corresponding technical challenges relating to security, processing, and network resources, service availability, and efficiency, among many other issues. One such challenge is associated with orchestrator execution planning including selecting one or more edge devices for executing parts of a workload based on compliance with key performance indicators (KPIs) of a service level agreement (SLA) associated with the workload.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
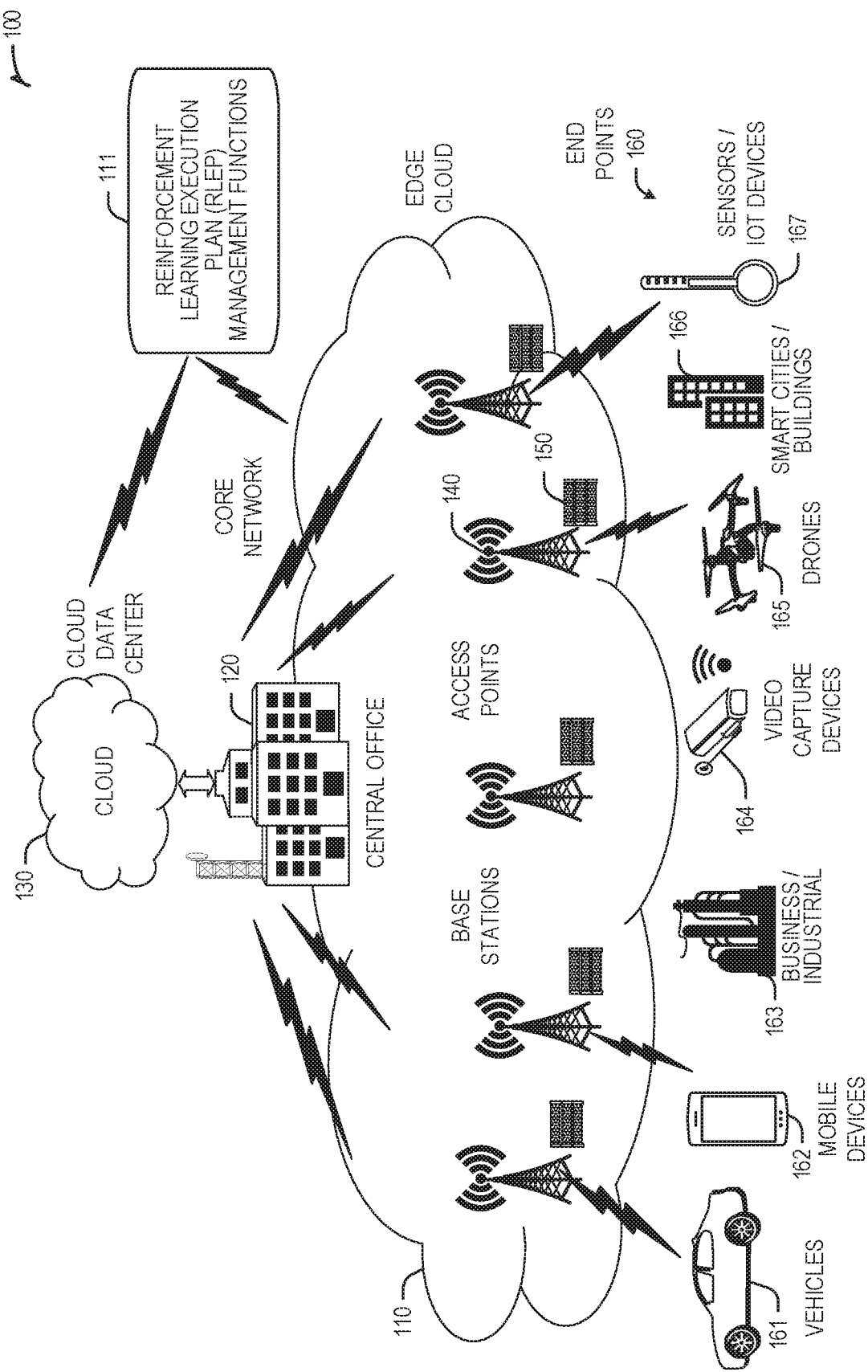
FIG. 1 illustrates an overview of an edge cloud configuration for edge computing.

The following embodiments generally relate to reinforcement learning execution plan (RLEP) management functions in a distributed edge computing environment. More specifically, techniques discussed herein use reinforcement learning and distributed ledger records (e.g., blockchain records) for selecting edge nodes and scheduling execution of edge service instances on the selected edge nodes to perform state transitions associated with a workload execution plan. A network management entity (e.g., a network orchestration system such as an edge orchestrator or a meta-orchestrator) is configured to generate an execution plan for a workload based on an SLA. The execution plan includes a plurality of state transitions associated with a corresponding plurality of edge service instances of the workload. As used herein, the term "state transition" indicates an initial processing state and a final processing state of service execution data processed during the execution of a corresponding edge service instance. Put another way, an edge computing device can execute the edge service instance, which causes the transition between the initial processing state and the final processing state of the data. In this regard, a workload execution plan is generated based on the SLA, and reinforcement learning and distributed ledger techniques are used for selecting the edge nodes to execute edge service instances causing the state transitions associated with the workload execution plan. Additional description of the RLEP management functions is provided hereinbelow in connection with at least FIG. 8-FIG. 12.

As used herein, the term "state of data" refers to a state of service execution, or a state of service execution data, or a state of service execution metadata. A search service may be used as a trivial example of the use of these terms. Performing a request in a search service does not change the state of the data on which the service is performed. However, it affects which resources were assigned or committed to the search service as it performed a requested operation (e.g., state of service execution), and this may have changed some resource configurations (e.g., state of service execution data), or may have constructed a log record of the search having been performed (e.g., state of service execution metadata), or may have affected a priority associated with various threads, data blocks in memory, etc. (e.g., service execution metadata).

As used herein, the term "platform resources" or "edge platform resources" includes network resources available to an edge computing device within a communication network such as an edge network. In this regard, platform resources may include hardware/software resources of the edge computing device itself as well as resources of other network nodes available for use by the edge computing device. As used herein, the term "telemetry observations" (or "telemetry data observations") includes data (e.g., sensor data) indicative of current usage of the platform resources (e.g., platform resources currently utilized or currently available for use). As used herein, the term "tenant" refers to a user of a service provided in network architecture, such as a user of a client node in an edge architecture. As used herein, the term "common database" includes a database configured for collaborative sharing across multiple tenants.

As used herein, the term "SLA" refers to one or more service level agreements or SLAs provided within a single platform. A separate layer may be used that spans multiple platforms to use end-to-end SLAs in connection with disclosed techniques. To differentiate between SLAs and service level objectives or SLOs, SLOs include application metrics and KPIs) (e.g., frames-per-second, or fps, streams per second, communication bandwidth, etc.), and SLAs are the resources (e.g., contractual agreements about various throughputs, latencies, availabilities, etc.) that are needed to be granted to perform or achieve an SLO (e.g., 10 GBs of memory to obtain 40 fps). An SLA may be considered a representation of interactions between a user/client and a network orchestrator entity, while an SLO may be considered the result of such interactions. Put another way, an SLA may represent the number of resources that need to be provided to a particular application to reach an SLO (e.g., a number of cores, memory bandwidth, etc.). The network orchestrator entity may convert/translate SLAs into SLOs or KPIs as well as generate an execution plan for a workload based on the SLA, where each state transition of the execution plan is performed by an edge computing device selected using the disclosed techniques. Generally, an SLA is a larger concept and an SLO is one aspect of an SLA. One SLA may describe multiple different SLOs, which are specific and measurable in terms of specific rates of various operations or maximum limits over errors, failures, durations of an outage, etc. SLA is the contractual agreement between a provider and a receiver that stipulates the various SLOs, and under what exceptional conditions a given SLO may not be met, etc.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power are often constrained. Thus, edge computing attempts to reduce the number of resources needed for network services, through the distribution of more resources which are located closer both geographically and in-network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their infrastructures. These include a variety of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use cases (e.g., autonomous driving or video surveillance) for connected client devices. Or as an example, base stations may be augmented with compute and acceleration resources to directly process service workloads for the connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will "moved" to the data, as well as scenarios in which the data will be "moved" to the compute resource. Or as an example, base station compute, acceleration and network resources can provide services to scale to workload demands on an as-needed basis by activating dormant capacity (subscription, capacity-ondemand) to manage corner cases, emergencies or to provide longevity for deployed resources over a significantly longer implemented lifecycle.

In some aspects, the edge cloud 110 and the cloud data center 130 can be configured with RLEP management functions 111. For example, network management entities within the edge cloud 110 and the cloud data center 130 can be configured with an RLEP manager (RLEPM) to performing the RLEP management functions 111. In some embodiments, the RLEP management functions include generating an execution plan for a workload based on an SLA. The generated execution plan includes a plurality of state transitions associated with a corresponding plurality of edge service instances of the workload. The RLEP management functions 111 performed by the RLEPM further include selecting an edge computing device from a plurality of available edge computing devices based on maximizing reinforcement learning reward values associated with multiple distributed ledger records (e.g., blockchain records). More specifically, each distributed ledger record includes an identification of an edge computing device, an indication of a state transition, an edge service instance executing on the edge computing device which can be used to perform one or more actions achieving the state transition, and a reinforcement learning reward value corresponding to the achieved state transition (e.g., the reinforcement learning reward value can be determined based on comparison of achieved KPIs after state transition with desired KPIs such as KPIs associated with an SLA). The RLEP management functions 111 include scheduling the execution of the edge service instance by the selected edge computing device to achieve the state transition specified by the workload execution plan. Additional functionalities and techniques associated with an RLEPM are discussed in connection with FIG. 8-FIG. 12.

Figure 2:
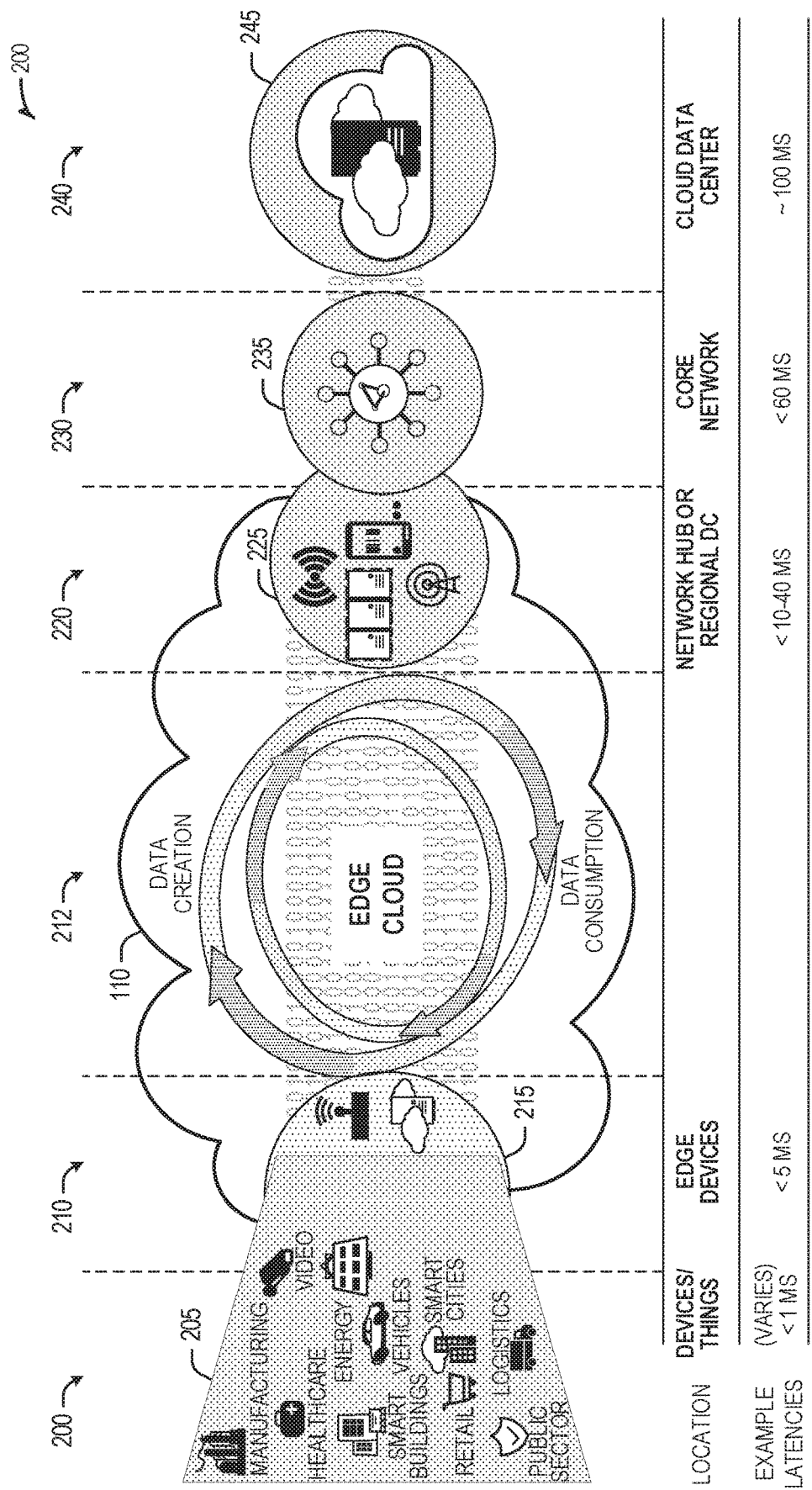
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, data communication, data transformation, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted. Any of the computational use cases 205 can be configured based on RLEP management functions 111, which may be performed by an RLEPM as discussed in connection with FIG. 8-FIG. 12.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ins at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of (a) Priority (throughput or latency; also referred to as service level objective or SLO) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, whereas some other input streams may tolerate an occasional failure, depending on the application); and (c) Physical constraints (e.g., power, cooling, and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real-time, and runtime contractual compliance for the transaction during the lifecycle of the service. When a component in the transaction is missing its agreed-to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing come the following caveats. The devices located at the edge are often resource-constrained and therefore there is pressure on the usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permission access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from the client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, the cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or another thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The networked components of the edge cloud 110 may be servers, multi-tenant servers, appliance computing devices, and/or any other type of computing device. For example, the edge cloud 110 may be hosted among one or more appliance computing device that is a self-contained processing system including a housing, case, or shell. In some cases, edge devices are devices presented in the network for a specific purpose (e.g., a traffic light), but that have processing or other capacities that may be harnessed for other purposes. Such edge devices may be independent of other networked devices and provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may implement a virtual computing environment such as a hypervisor for deploying virtual machines, an operating system that implements containers, etc. Such virtual computing environments provide an execution environment in which one or more applications may execute while being isolated from one or more other applications.

Figure 3:
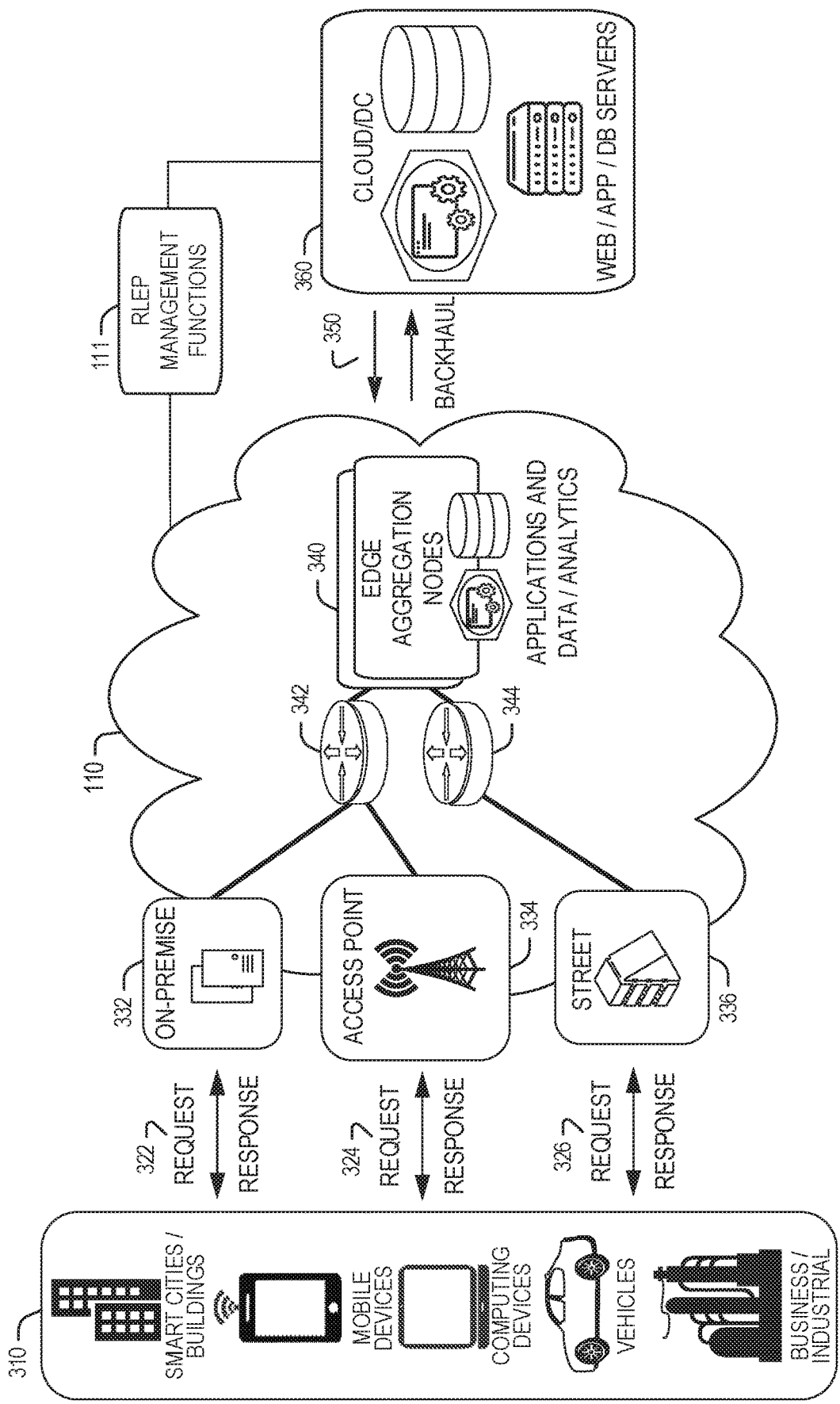
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure. In an example embodiment, the edge cloud 110 and the cloud or data center 360 utilize RLEP management functions 111 in connection with disclosed techniques. The RLEP management functions may be performed by at least one RLEP manager as discussed in connection with FIG. 8-FIG. 12.

Figure 4:
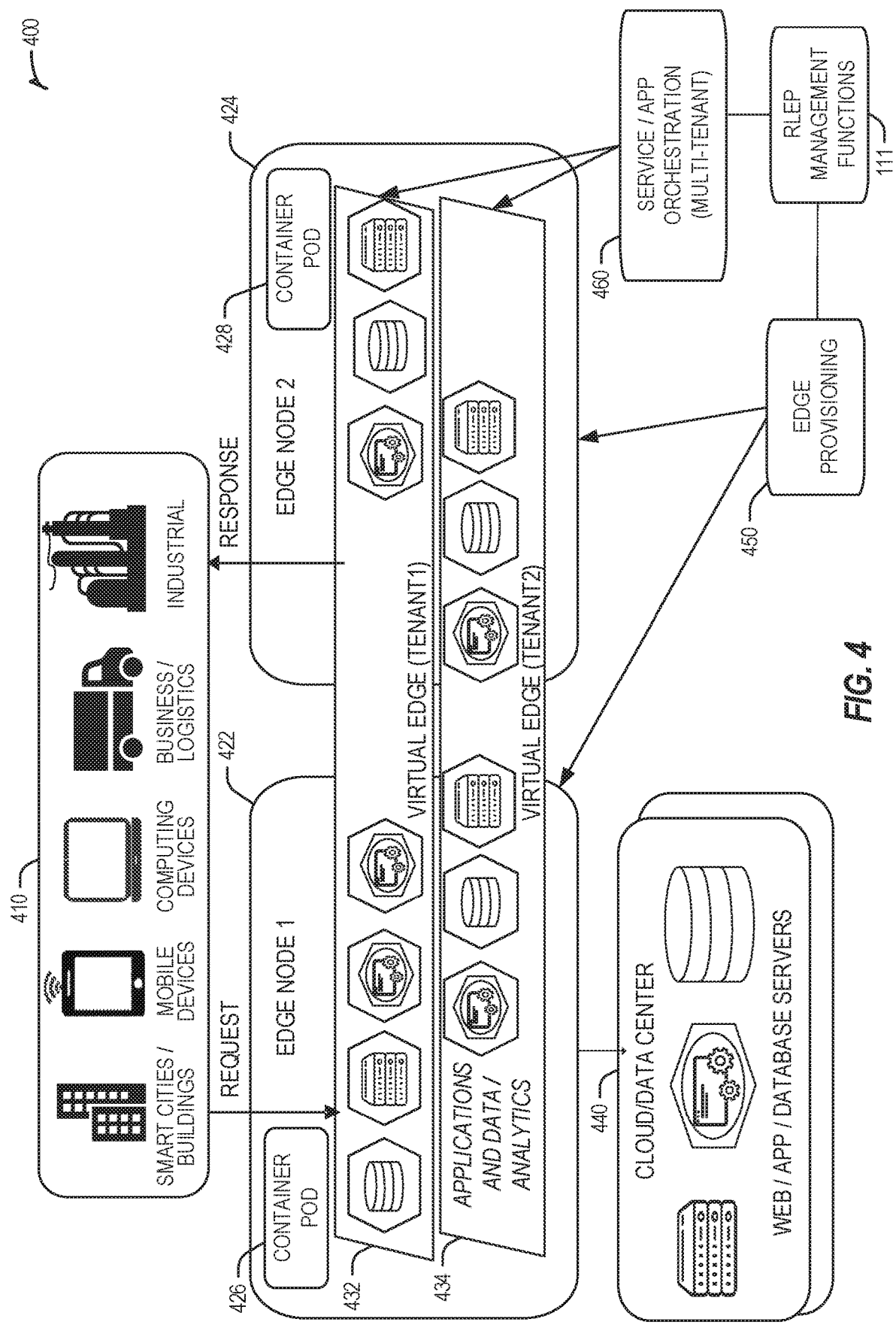
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically. FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers the first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460. In an example embodiment, the edge provisioning functions 450 and the orchestration functions can utilize RLEP management functions 111 in connection with disclosed techniques. The RLEP management functions 111 may be performed by an RLEP manager as discussed in connection with FIG. 8-FIG. 12.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant-specific cryptographic key such that the combination of key and slice may be considered a "root of trust" (RoT) or tenant-specific RoT. An RoT may further be computed dynamically composed using a DICE (Device Identity Composition Engine, described at https://www.microsoft.com/en-us/research/project/dice-device-identifier-composition-engine/) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshaling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain an RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support an RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload-specific keys protecting its content from a previous edge node. As part of the migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency-sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving KPI targets based on SLA contracts. The pod controller determines which container requires which resources and for how long to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents the assignment of resources until the right tenant authenticates or prevents provisioning of data or a workload to a container until an attestation result is satisfied.

Also, with the use of container pods, tenant boundaries can still exist but in the context of each pod of containers. If each tenant-specific pod has a tenant-specific pod controller, there will be a shared pod controller that consolidates resource allocation requests to avoid typical resource starvation situations. Further controls may be provided to ensure the attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked before the second pod executing.

Figure 5:
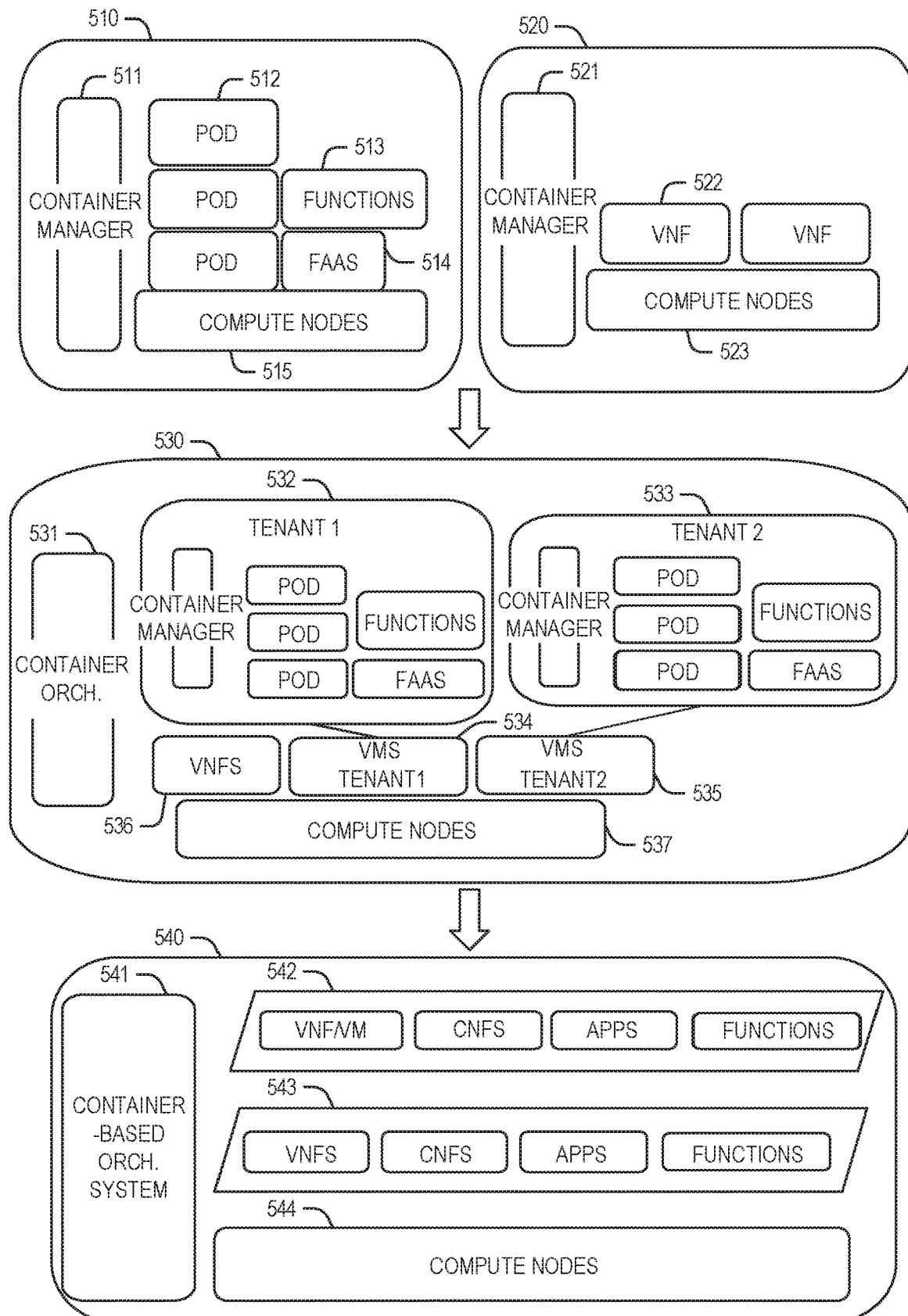
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions and functions-as-a-service instances through execution via compute nodes (515 in arrangement 510) or to separately execute containerized virtualized network functions through execution via compute nodes (523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside from the execution of virtualized network functions). This arrangement is further adapted for use in system arrangement 540, which provides containers 542, 543, or execution of the various functions, applications, and functions on compute nodes 544, as coordinated by a container-based orchestration system 541.

The system arrangements depicted in FIG. 5 provide an architecture that treats VMs, Containers, and Functions equally in terms of application composition (and resulting applications are combinations of these three ingredients). Each ingredient may involve the use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves, and hardware partitioning schemes may be used by edge owners to enforce tenancy. Other isolation environments may include bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software-defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
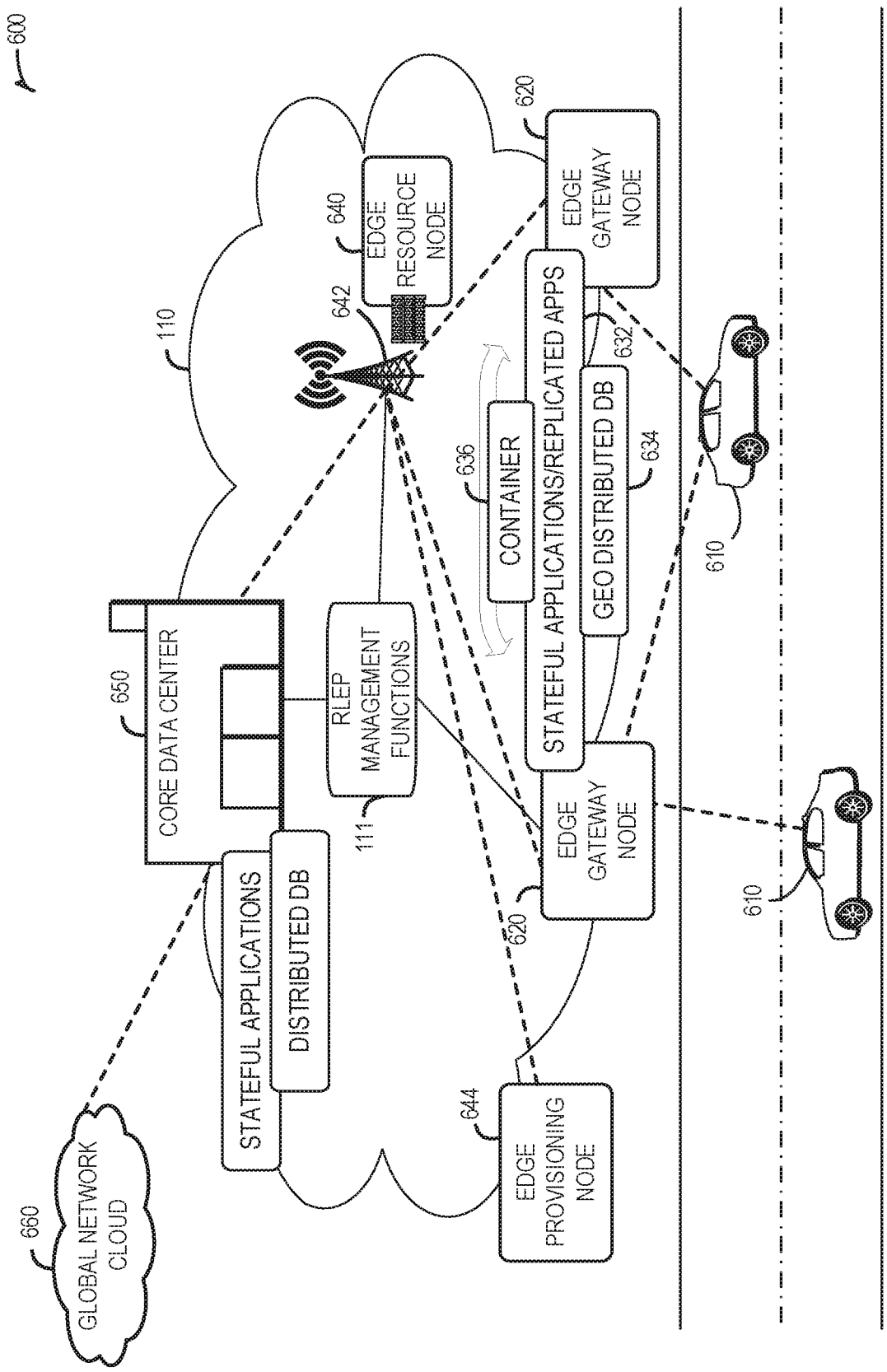
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles that communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 620 may propagate to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a base station of a cellular network). As discussed above, the respective edge resource nodes 640 include an amount of processing and storage capabilities, and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location, or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicates with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or a pod of containers) may be flexibly migrated from an edge node 620 to other edge nodes (e.g., 620, 640, etc.) such that the container with an application and workload does not need to be reconstituted, re-compiled, re-interpreted for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container-native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile units, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In an example embodiment, the edge cloud 110 utilizes RLEP management functions 111 in connection with disclosed techniques. The RLEP management functions 111 may be performed by at least one RLEP manager (e.g., as present within the edge computing device 1021 in FIG. 10 as well as orchestration node 1130 and edge computing devices in edge clusters 1102-1108 in FIG. 11), as discussed in connection with FIG. 8-FIG. 12.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application that may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer-readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer-readable instructions 782 of FIG. 7B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer-readable instructions such as the example computer-readable instructions 782 of FIG. 7B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer-readable instructions 782 from the edge provisioning node 644. For example, the software instructions, which may correspond to the example computer-readable instructions 782 of FIG. 7B may be downloaded to the example processor platform/s, which is to execute the computer-readable instructions 782 to implement the methods described herein.

In some examples, the processor platform(s) that execute the computer-readable instructions 782 can be physically located in different geographic locations, legal jurisdictions, etc. In some examples, one or more servers of the edge provisioning node 644 periodically offer, transmit, and/or force updates to the software instructions (e.g., the example computer-readable instructions 782 of FIG. 7B) to ensure improvements, patches, updates, etc. are distributed and applied to the software instructions implemented at the end-user devices. In some examples, different components of the computer-readable instructions 782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 7A and 7B. Respective edge compute nodes may be embodied as a type of device, appliance, computer, or other "thing" capable of communicating with other edges, networking, or endpoint components. For example, an edge compute device (also referred to as edge computing device) may be embodied as a personal computer, a server, a smartphone, a mobile compute device, a smart appliance, an in-vehicle compute system (e.g., a navigation system), a self-contained device having an outer case, shell, etc., or other device or system capable of performing the described functions.

Figure 7A:
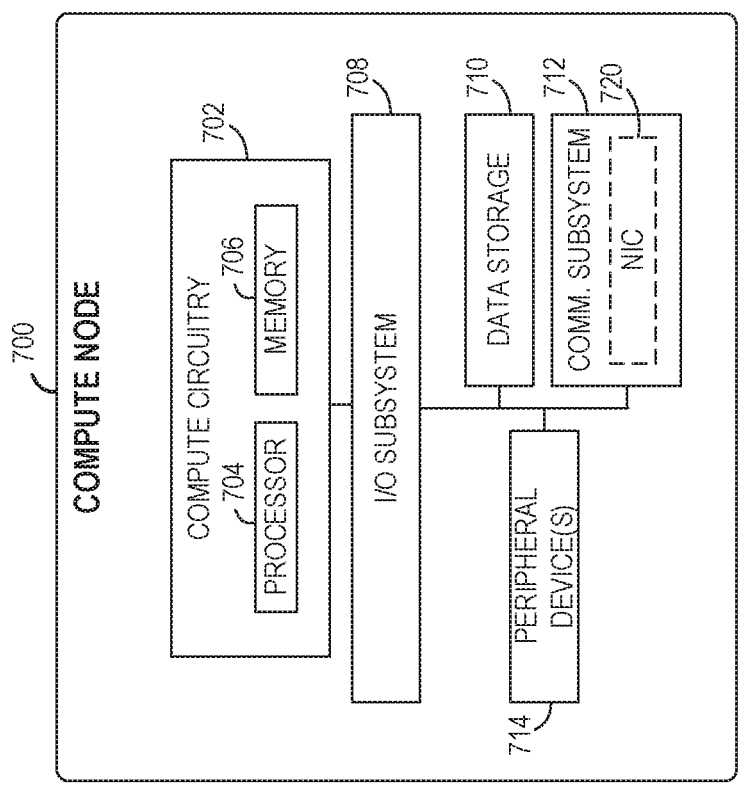
FIG. 7A provides an overview of example components for compute deployed at a compute node in an edge computing system.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application-specific integrated circuit (ASIC), reconfigurable hardware or hardware circuitry, or other specialized hardware to facilitate the performance of the functions described herein. Also in some examples, the processor 704 may be embodied as a specialized x-processing unit (xPU) also known as a data processing unit (DPU), infrastructure processing unit (IPU), or network processing unit (NPU). Such anxPU may be embodied as a standalone circuit or circuit package, integrated within a SOC or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general-purpose processing hardware. However, it will be understood that an xPU, a SOC, a CPU, and other variations of the processor 704 may work in coordination with each other to execute many types of operations and instructions within and on behalf of the compute node 700.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of service execution data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three-dimensional crosspoint memory device (e.g., Intel® 3D XPoint™ memory), or other byte-addressable write-in-place nonvolatile memory devices, the memory device may refer to the die itself and/or to a packaged memory product. In some examples, 3D crosspoint memory (e.g., Intel® 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of device configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, an IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

Figure 7B:
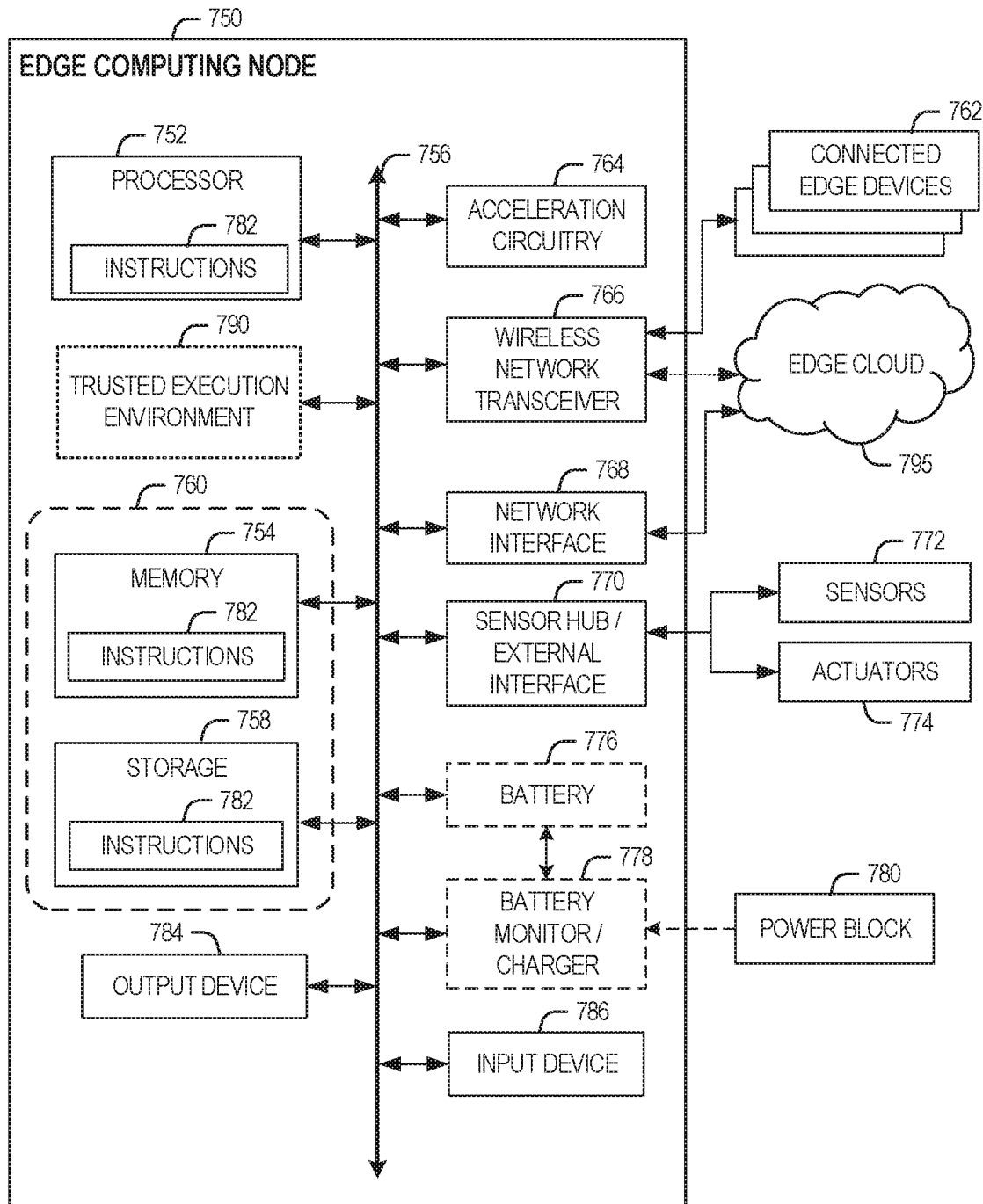
FIG. 7B provides a further overview of example components within a computing device in an edge computing system.

In a more detailed example, FIG. 7B illustrates a block diagram of an example of components that may be present in an edge computing node 750 for implementing the techniques (e.g., operations, processes, methods, and methodologies) described herein. This edge computing node 750 provides a closer view of the respective components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system.

The edge computing device 750 may include processing circuitry in the form of a processor 752, which may be a microprocessor, a multi-core processor, a multithreaded processor, an ultra-low voltage processor, an embedded processor, an xPUDPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, Calif. As an example, the processor 752 may include an Intel) Architecture Core™ based CPU processors, such as a Quark™, an Atom™, an i3, an i5, an i7, an i9, or an MCU-class processor, or another such processor available from Intel). However, any number other processors may be used, such as available from Advanced Micro Devices, Inc. (AMD®) of Sunnyvale, Calif., a MIPS®-based design from MIPS Technologies, Inc. of Sunnyvale, Calif., an ARM®9-based design licensed from ARM Holdings, Ltd. or a customer thereof, or their licensees or adopters. The processors may include units such as an A5-A13 processor from Apple® Inc., a Snapdragon™ processor from Qualcomn® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) per a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP), or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems, and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, eXtreme Digital (XD) picture cards, and the like, and Universal Serial Bus (USB) flash drives. In an example embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group. or the ZigBee® standard, among others. Any number of radios, configured for a particular wireless communication protocol, may be used for the connections to the connected edge devices 762. For example, a wireless local area network (WLAN) unit may be used to implement Wi-Fi® communications under the Institute of Electrical and Electronics Engineers (IEEE) 802.11 standard. Also, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (IO) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service, or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium-ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The batten monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, Calif., among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application-specific integrated circuit (ASIC).

Also in a specific example, the instructions 782 on the processor 752 (separately, or in combination with the instructions 782 of the machine-readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in device 750 through the TEE 790 and the processor 752.

In an example, the instructions 782 provided via memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of several transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Reinforcement Learning Execution Plan Management

Edge environments have various performance vectors (e.g., latency, throughput, caching, filtering, security, etc.) that can be associated with KPIs and can be considered when configuring edge systems. The physical location of the compute or storage resource plays a significant role when determining whether or not a KPI will be met by an SLA (or other contracts) between a service supplier and a service subscriber. With multiple tiers of service and multiple points of access (POAs) (e.g., base stations, regional offices, data center/cloud, etc.) multiple KPIs may need to be met when an execution plan associated with an SLA is performed. In this regard, there may be multiple possible orchestration optimization options to consider for a single subscriber in an edge communication system with multiple edge computing devices and POAs, which can be burdensome for most stochastic planning and scheduling algorithms to optimize efficiently and accurately.

Additionally, there can be multiple subscribers who, if scheduled to the same platform resources, may interfere with one another in real-time resulting in the need for dynamic re-planning. In some embodiments, significant optimization improvements can be achieved using reinforcement learning techniques during execution plan management. A challenge of reinforcement learning depends on the observability of factors that influence an outcome. Observability is challenging in an edge communication system because observations do not occur simultaneously or may be isolated by edge POAs that restrict visibility across the edge spectrum.

RLEP management functions discussed herein use reinforcement learning and distributed ledger records for selecting edge nodes and scheduling execution of edge service instances on the selected edge nodes to perform state transitions associated with a workload execution plan. A network management entity (e.g., a network orchestration system such as an edge orchestrator or a meta-orchestrator) is configured to generate an execution plan for a workload based on an SLA. As used herein, the term "edge orchestrator" indicates a network management entity associated with a cluster of edge nodes (e.g., nodes in any of network layers 210-240 or node clusters 808-812). As used herein, the term "meta-orchestrator" indicates a network management entity that is configured to manage one or more edge orchestrators.

The execution plan includes a plurality of state transitions associated with a corresponding plurality of edge service instances of the workload. An edge computing device can execute the edge service instance, which causes the transition between the initial processing state and the final processing state of the data. In this regard, a workload execution plan is generated based on the SLA, and reinforcement learning and distributed ledger techniques are used for selecting the edge nodes to execute edge service instances causing the state transitions associated with the workload execution plan.

In an example embodiment, the workflow execution plan may be contributed to (e.g., stored in) a distributed ledger such as a blockchain. The edge computing device servicing the plan, including the network management entity, are also distributed ledger nodes (e.g., blockchain nodes) that log execution of a portion of the workflow execution plan. For example, after an edge computing device executes an edge service instance causing a state transition indicated by workflow execution plan, the edge computing device can generate and store a new distributed ledger record including the edge computing device ID, the initial processing state and the final processing state of the state transition, the edge service instance which was executed to cause the state transition, telemetry data observations at a time of completion of the state transition (e.g., an indication of used or available platform resources at the edge computing device), and a reinforcement learning reward value determined based on desired KPIs indicated by the workflow execution plan and actual KPIs corresponding to the telemetry data observations.

Additionally, disclosed RLEP management functions may use a hierarchy of blockchains that achieve the finality of observations across the edge spectrum while enabling efficient localized commitment of observations within a "home" or local-POA blockchain. The finalized commitments (e.g., stored as blockchain records) may be used by the network management entity for execution plan management such as selecting an edge computing device to execute certain edge service instances causing a state transition indicated by the execution plan. Additional description of the RLEP management functions is provided hereinbelow in connection with at least FIG. 8-FIG. 12.

Figure 8:
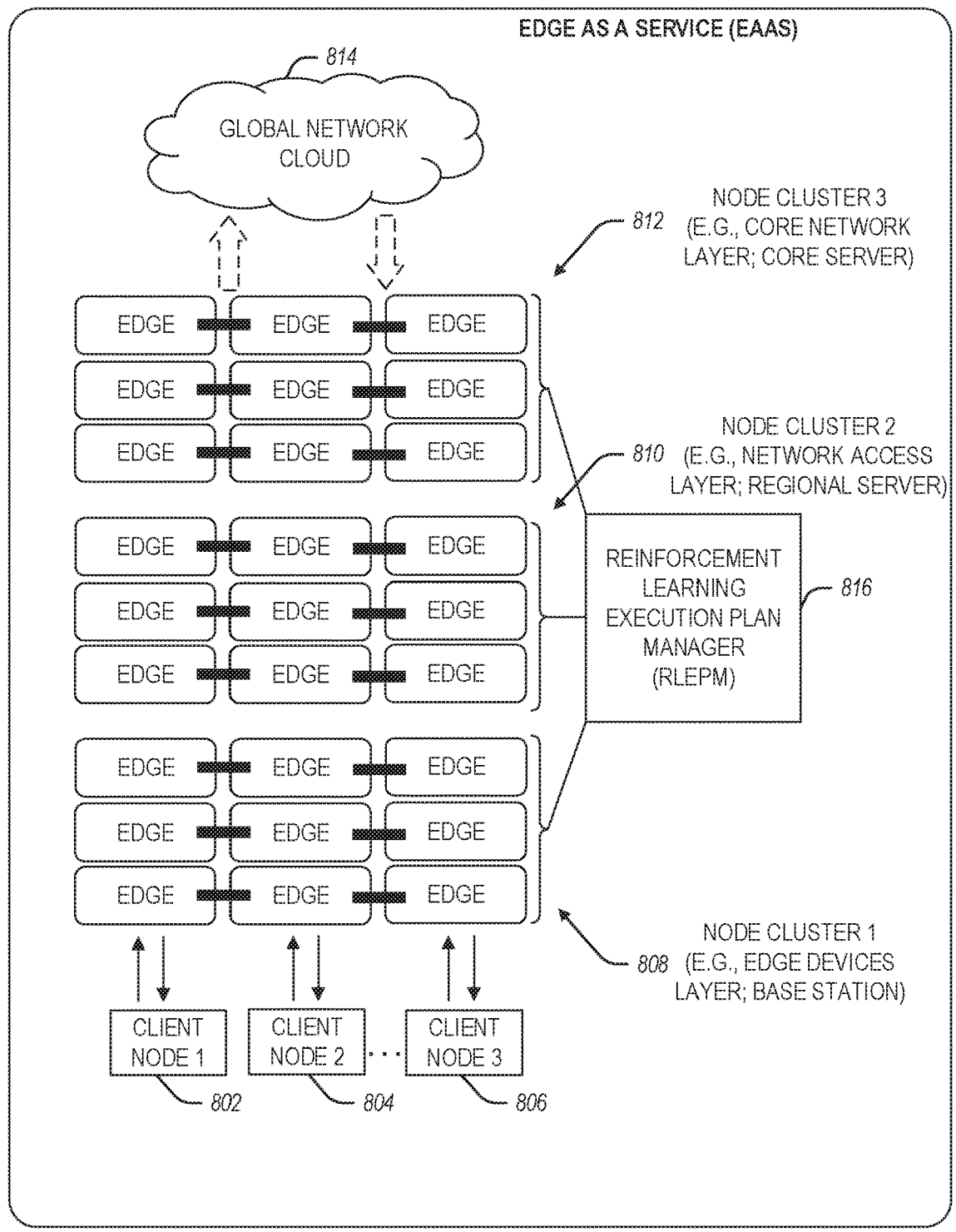
FIG. 8 illustrates a block diagram of an Edge-as-a-Service (EaaS) architecture using a reinforcement learning execution plan (RLEP) manager performing RLEP functions, according to an example.

FIG. 8 illustrates a block diagram of an Edge-as-a-Service (EaaS) architecture using at least one RLEPM 816 to perform RLEP functions, according to an example. The EaaS architecture 800 includes client compute nodes 802, 804, . . . , 806 communicating with a plurality of edge devices (or nodes) operating as part of node clusters in different edge layers. For example, node cluster 808 includes edge devices associated with an edge devices layer. Node cluster 810 includes edge devices associated with a network access layer, and node cluster 812 includes edge devices associated with a core network layer. A core server (e.g., a server associated with a core data center) may be part of the node cluster 812. The global network cloud 814 may be located at a cloud data center layer. A more detailed diagram of example RLEP functions performed by the RLEPM is illustrated in connection with FIG. 10-FIG. 12.

Although an illustrative number of client compute nodes 802, 804, . . . , 806, edge devices in node clusters 808, 810, 812, and a global network cloud 814 are shown in FIG. 8, it should be appreciated that the EaaS architecture 800 may include more or fewer components, devices, or systems at each layer. Additionally, the number of components of each layer (e.g., the layers of node clusters 808, 810, and 812) may increase at each lower level (i.e., when moving closer to endpoints).

Consistent with the examples provided herein, each of the client compute nodes 802, 804, . . . , 806 may be embodied as any type of endpoint component, device, appliance, or "thing" capable of communicating as a producer or consumer of data. Further, the label "node" or "device" as used in the EaaS architecture 800 does not necessarily mean that such node or device operates in a client (primary) role or another (secondary) role; rather, any of the nodes or devices in the EaaS architecture 800 refer to individual entities, nodes, or subsystems which include discrete or connected hardware or software configurations to facilitate or use the edge cloud 110. The client compute nodes 802, 804, . . . , 806 can include computing devices at an endpoint (devices and things) layer, which accesses the node clusters 808, 810, 812 to conduct data creation, analysis, and data consumption activities.

In an example embodiment, the EaaS architecture 800 can include at least one RLEPM 816 configured to perform RLEP management functions 111 in connection with disclosed techniques. The RLEP management functions 111 may be performed by the at least one RLEPM as configured within one or more management nodes (e.g., an edge orchestrator node or a meta-orchestrator node within any of the node clusters 808-812) and/or within one or more connectivity nodes (e.g., an edge computing device within any of the node clusters 808-812), as discussed in connection with FIG. 10-FIG. 12.

Figure 9:
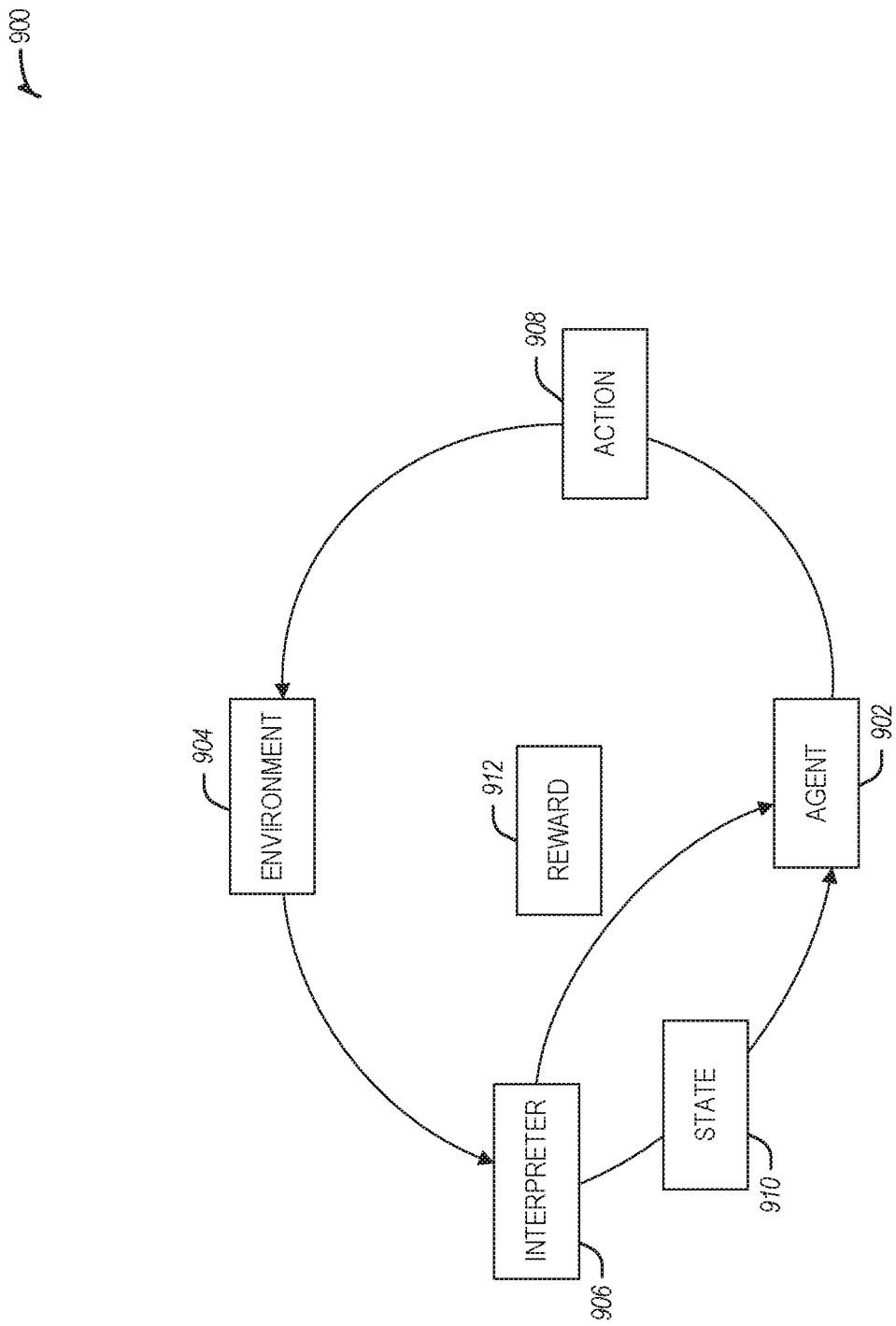
FIG. 9 illustrates an example reinforcement learning scenario which can be used with the disclosed techniques.

FIG. 9 illustrates a diagram 900 of an example reinforcement learning scenario that can be used with the disclosed techniques. Referring to FIG. 9, the illustrated reinforcement learning (RL) scenario in FIG. 9 includes an agent 902 (e.g., an edge computing device) and an interpreter 906 (e.g., an RLEPM within the edge computing device), where reinforcement can be based on a Markov decision process using rewards.

During reinforcement learning, the agents 902 can perform an action 908 (e.g., by executing one or more edge service instances) in environment 904 (e.g., an edge communication system), which is interpreted by the interpreter 906 into a reward 912 (e.g., reinforcement learning reward value) and a representation of a device state 910, which are fed back into the agent 902.

In some embodiments, reinforcement learning based on a Markov decision process can be modeled as follows:

(a) A set of environment and agent states is referenced as S;

A set of actions (e.g., including action 908) of the agent 902 is referenced as A;

$P_a(s,s') = \Pr(s_{t+1} = s' | s_t = s, a_t = a)$ is the probability of transition (at time t) from state s to state s' under action a, and $R_a(s, s')$ is the immediate reward after the transition from state s to s' with action a. Rules that describe what the agent observes (e.g., telemetry data observations O) are a function of the telemetry that can be collected within the environment. In some aspects, the observation may include the immediate reward associated with the last transition. In some aspects, the agent may observe the current environmental state, which to achieve full observability may require many points of observation. In some aspects, the set of actions available to the agent may be restricted or provided by another agent (e.g., execution of an edge service instance representing an action can be scheduled by a network management entity such as an orchestrator).

A reinforcement learning agent interacts with its environment in discrete time steps. At each time t, the agent receives an observation or, which typically includes the reward $r_t$. It then chooses an action $a_t$ from the set of available actions, which is subsequently sent to the environment. The environment moves to a new state $s_{t+1}$ and the reward $r_{t+1}$ associated with the transition $(s_t, a_t, s_{t+1})$ is determined. The goal of the reinforcement learning agent 902 may be to collect as much reward as possible. The agent can choose any available action A as a function of the historical context.

Additional description of reinforcement learning is available at https://en.wikipedia.org/wiki/Reinforcement_learning.

In an example embodiment, an RLEPM can be configured to apply the above reinforcement learning principles during edge orchestration planning, with the use of a distributed ledger (such as a blockchain) to approach optimal observability and utilization of platform resources among a community of edge nodes within an edge location system. As explained hereinabove, an SLA is a contract between an edge subscriber and an edge workload provider that sets performance, reliability, and response time expectations (i.e., KPIs) for a workload. In an example embodiment, these expectations are modeled as rewards (e.g., $R_{SLA}$) according to the agreed SLA. If the workload execution plan completes within the contracted KPIs then a distributed ledger record which includes the reinforcement learning reward value (RLRV) is generated and contributed to a distributed ledger (also referred to as an edge distributed ledger technology or EDLT).

The telemetry observations O associated with the reward $r_t$ for a given state transition produces a historical record of the form $H_t=(n_t, s_t, a_t, s_{t+1}, r_t, Ot)$, where $n_t$ is an edge node identification, $s_t$ is an initial processing state of a state transition (e.g., an initial state of data associated with a workload), $s_{t+1}$ is a final processing state of a state transition (e.g., a final state of the data), $a_t$ is an action performed the edge node (e.g., an edge service instance which performs the action that causes the state transition from the initial processing state to the final processing state), $O_t$ is a set of telemetry observations indicative of platform resource usage or availability, and $r_t$ is the reinforcement learning reward value (RLRV) determined by the RLEPM based on the telemetry observations (e.g., based on a deviation of the telemetry observations and desired KPIs associated with an SLA).

In some embodiments, the set of telemetry observations $O_t$ are based on edge telemetry sensing from multiple edge nodes; namely, for each edge node N, there are V telemetry values that can be observed at time t (e.g., a time an edge node completes execution of an edge service instance achieving a state transition). The telemetry observations $O_t$, therefore, may include telemetry observations from multiple edge nodes determined at time t, such as (n0: (v0, v1, . . . , vx), . . . , ny: (v0, v1, . . . , vx), . . . , ny: (v0, v1, . . . , vx)), where $n_i$ is the edge node identification, x is the number of telemetry sensor values, and y is the number of nodes in the edge communication system.

Figure 11:
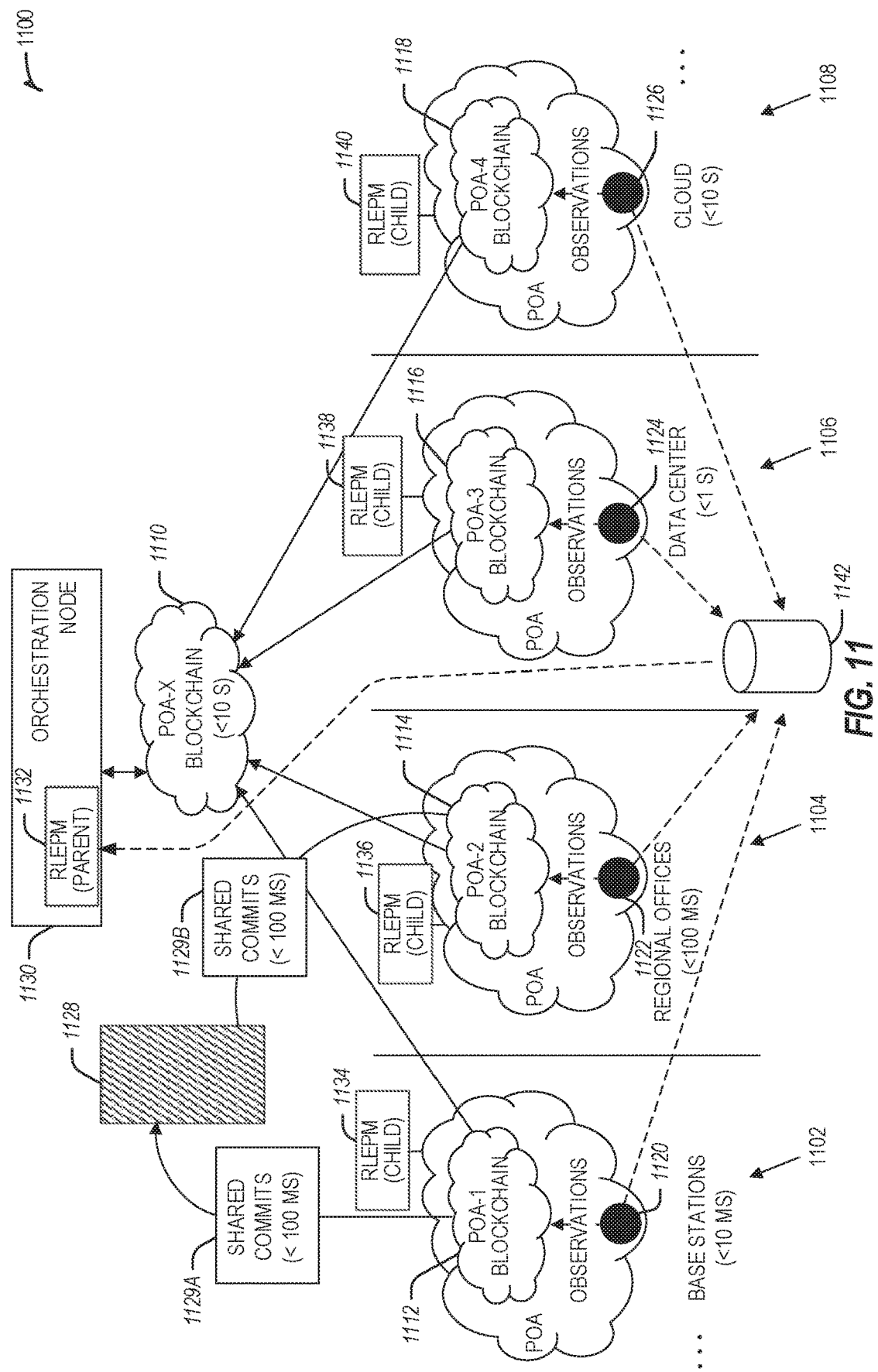
FIG. 11 illustrates a hierarchy of distributed ledgers in an edge computing system using multiple RLEP managers, according to an example.

In some embodiments, each time an edge node completes an edge service instance and a corresponding state transition, the edge node generates a distributed ledger record $H_t$ that is contributed to a distributed ledger (e.g., a distributed ledger of a management node such as an orchestrator, a distributed ledger of the edge node, or in multiple distributed ledger in a hierarchical distributed ledger architecture such as illustrated in FIG. 11). Thereafter, when a workload execution plan is configured by an RLEPM and scheduled for execution by one or more edge nodes, the RLEPM may query the distributed ledger to obtain past distributed ledger records with corresponding state transitions and reinforcement learning reward values. The RLEPM may prioritize possible actions (that achieves the desired state transition by executing an edge service instance) according to the most desirable reinforcement learning reward values. For example, the RLEPM may generate an execution plan based on an SLA, with the execution plan including multiple state transitions. For a specific state transition, the RLEPM may retrieve distributed ledger records that include such state transition, may select a distributed ledger record based on a maximum reinforcement learning reward value, and may schedule the execution of an edge service instance achieving the state transition by an edge node associated with the distributed ledger record.

In some embodiments, the RLEPM may also consider the telemetry observations within the distributed ledger records that include the state transition, and a selection of an edge node for the execution of the edge service instance achieving the state transition may be based on the telemetry observations (e.g., if the variance in current telemetry observations (Vcurrent) versus prior (or historical) telemetry observations (Vhistorical) is small (e.g., at or below a preconfigured threshold), then the historical record may be prioritized higher than those with wider variance). In some aspects, a second-pass sort is applied on the retrieved distributed ledger records based on the reward values so that the historical records with the highest reward potential but lowest telemetry variance filter to the top of the priority queue. The network management node selects the action that achieves the desired state transition (e.g., $s_t, a_t, s_{t+1}$), based on this filtered reward and variance history.

Figure 10:
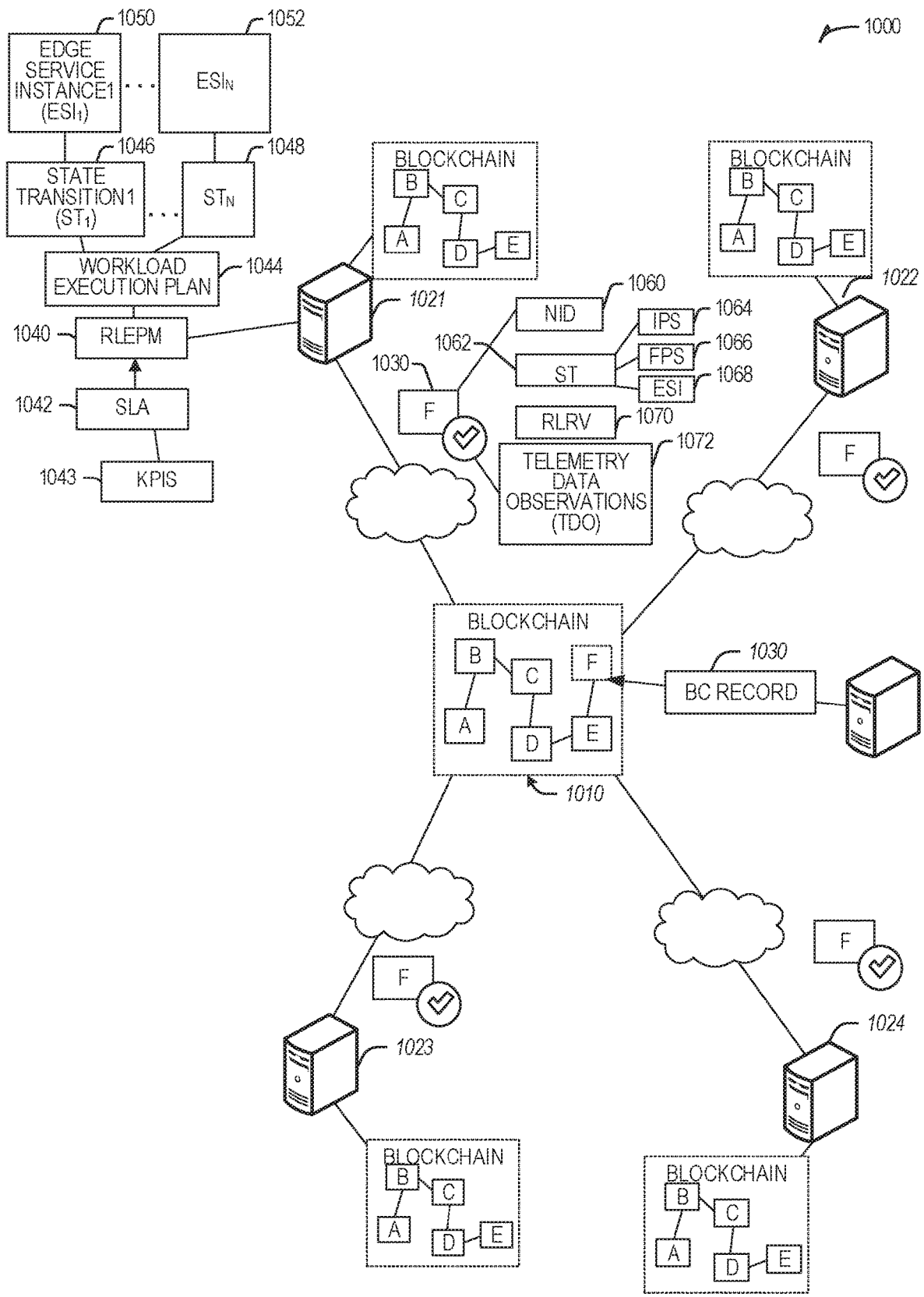
FIG. 10 illustrates a diagram of a distributed ledger system with an RLEP manager, such as may be implemented in a blockchain, according to an example.

FIG. 10 illustrates a diagram of a distributed ledger system 1000 (also referred to as a blockchain system 1000) with an RLEPM 1040 configured to perform RLEP management functions, according to an example.

As is understood, a blockchain is one type of a distributed ledger that maintains a growing list of data records that are hardened against tampering and revision. A "Hyperledger" commonly refers to an open-source blockchain-based implementation that defines roles and transactions among blockchain nodes. Additional description of a Hyperledger is available at https://www.hyperledger.org/use/fabric. Other forms of distributed ledgers and blockchain systems may also be used in connection with the disclosed techniques.

As shown in FIG. 10, a common blockchain implementation is structured to track blockchain records (also referred to as distributed ledger records) in the blockchain 1010, where the blockchain records hold data or both data and programs. Each blockchain record holds batches of individual "transactions" among blockchain participants 1021, 1022, 1023, and 1024. Each blockchain record includes a timestamp and linking information (usually a hash value) linking the current block to the previous block; the linking information allows traversal of the blockchain (in either direction). Thus, the addition of a blockchain record 1030 to the blockchain 1010 by these or other participants can be ensured with traceability, immutability, provability, and reliability due to the distributed nature and verification of multiple transactions.

Blockchain records are integrity protected using a distributed hashing algorithm that requires each transaction processor (e.g., "miner") to agree to the next block in the blockchain. Integrity is achieved through a consensus of multiple miners, each miner having access to its copy of the ledger. If a majority of the miners agree on the contents of the ledger, then those agreed upon contents become the "truth" for the ledger; the miners that disagree will accept the truth of the majority (otherwise, they would not be able to function). Integrity is provable because an attacker would have to compromise a majority of miners and modify their copies of the ledger; this is extremely difficult (if not impossible). In an example embodiment, an enterprise or private blockchain may be used, including Hyperledger fabric. In this case, the consensus algorithm is pluggable and the consensus is only required among a small number of validators who independently check and arrive at a consistent determination of the chaining order among proposed transactions to be entered into the DLT.

In an example embodiment, blockchain participants 1021, 1022, 1023, and 1024 can be EaaS communication nodes such as any of the nodes in node clusters 808, 810, and 812 in FIG. 8, as well as network management entities such as edge orchestrators or meta-orchestrators. Additionally, communications associated with RLEP management functions can be stored or retrieved by each of the blockchain participants as a distributed ledger record of the form $H_t$ as discussed above.

For example, blockchain participant 1021 can be a network management node such as an edge orchestrator configured with RLEPM 1040. The RLEPM 1040 receives an SLA 1042 associated with the KPIs 1043. The RLEPM 1040 can translate the SLA 1042 and generate a workload execution plan 1044 for a workload (e.g., a video data processing workload, and audio data processing workload, or another type of workload). The workload execution plan 1044 can identify a plurality of state transitions 1046, . . . , 1048 (or ST1, . . . , STn) associated with a corresponding plurality of edge service instances 1050, . . . , 1052 (or ESI1, . . . , ESIn). More specifically, a state transition (e.g., ST1) can include an initial processing state and a final processing state of data associated with the workload. The RLEPM 1040 can identify the corresponding edge service instance (e.g., ESI1) which can be executed to achieve the state transition (e.g., ST1).

In an example embodiment, blockchain records within the blockchain 1010 can be of the form $H_t$ as discussed above. Specifically, a blockchain record 1030 includes a node identification (NID) 1060 identifying an edge node, a state transition (ST) 1062, a reinforcement learning reward value (RLRV) 1070, and telemetry data observations (TDO) 1072. The ST 1062 includes an initial processing state (IPS) 1064, a final processing state (FPS) 1066, and an edge service instance (ESI) 1068 which is executed to achieve the state transition between IPS 1064 and FPS 1066. The RLRV 1070 is a reward value determined based on the TDO 1072 (e.g., a deviation of the TDO 1072 from one or more desired KPs).

In operation, after the RLEPM 1040 generates the workload execution plan 1044, the RLEPM schedules execution of the first state transition 1046 of the execution plan as follows. The RLEPM 1040 can search blockchain 1010 and retrieve all blockchain records (such as blockchain record 1030) that identify the state transition 1046. The RLEPM 1040 selects one of the blockchain records based on the RLRVs specified by the blockchain records (e.g., the RLEPM 1040 selects the blockchain record with the highest RLRV), the RLEPM 1040 identifies the edge node by the NID in the selected blockchain record, and schedules execution of the edge service instance 1050 corresponding to the state transition 1046 at the identified edge node.

After the edge node completes execution of the edge service instance, achieving state transition 1046 that is part of the workload execution plan 1044, the edge node communicates a confirmation to the RLEPM 1040 so that the RLEPM 1040 can schedule the execution of the next state transition of the workload execution plan. In an example embodiment, after the edge node completes execution of the edge service instance, the edge node can determine telemetry data observations at a time the state transition was completed and calculate RLRV based on the telemetry data observations. The edge node then generates a new blockchain record of the form $H_t$, specifying the edge node ID, the state transition that has been completed (including the initial processing state, the final processing state, and identification of the edge service instance that was executed, causing the state transition), the RLRV, and the telemetry data observations determined at the time the state transition was completed. The new blockchain record is then committed to the blockchain 1010 as well as to any other hierarchical blockchains or databases that can be accessed by the network management node 1021. Additional RLEPM functionalities associated with a hierarchical distributed ledgers are discussed in connection with FIG. 11.

Even though FIG. 10 illustrates a blockchain system implementation, the disclosure is not limited in this regard and other types of distributed ledger architectures (e.g., a Hyperledger fabric or another type of private distributed ledger) can be used as well.

FIG. 11 illustrates a hierarchy of distributed ledgers in an edge computing system 1100 using multiple RLEP managers, according to an example. The edge computing system 1100 includes a network management node (or an orchestration node) 1130 associated with a node cluster (or point of access (POA)) with a distributed ledger 1110, as well as a plurality of edge devices in node clusters (or POAs) 1102, 1104, 1106, and 1108 (with corresponding distributed ledgers 1112, 1114, 1116, and 1118). Each of the POAs can be associated with a specific latency, such as a latency smaller than 10 ms for POA 1102, latency smaller than 100 ms for POA 1104, latency smaller than is for POA 1106, and latency smaller than 10s for POA 1108.

In some embodiments, the edge computing system 1100 is optimized for efficient recording of distributed ledger records by constructing a distributed ledger hierarchy (DLH) including a parent distributed ledger (e.g., distributed ledger 1110) and smaller distributed ledgers (DLs) (e.g., child distributed ledgers 1112-1118) associated with POAs with a limited number of edge nodes (for example, 300-500 edge nodes in each POA). Consistency across the DLH may be achieved by using a parent DL 1110 that only processes committed blocks from its child DLs (e.g., DLs 1112-1118). In some aspects, a third or a fourth layer of parent DLs can be constructed to scale up for larger edges computing systems. Once a distributed ledger record of the form $H_t$ (or H record) is committed to a parent DL, the H records from peer DLs may be replicated to each peer DL in a shared database of committed blocks. For example, shared database 1128 can include DL records (e.g., 1129A and 1129B) that have been committed in DLs 1112 and 1114. Orchestrators (e.g., orchestration node 1130) may consult their local respective pools of historical data (e.g., DL 1110 collecting DL records committed in child DLs 1112-1118) or one or more shared databases with DL records committed in child DLs (e.g., shared database 1128 including shared commits, or DL records 1129A and 1129B from DLs 1112 and 1114 respectively) as needed to perform execution planning and performing RLEP management functions. In some embodiments, periodic background analytics can be performed on the replicated data set to see if replicant record integrity is compromised (due to programming error or malicious attacks). Edge workloads involving significant value computations such as large financial transactions, the replicated data set integrity can be checked before finding the optimal execution plan.

In some embodiments, each of the DLs 1112-1118 serves as a decentralized collection and synchronization service that ensures each observable event from edge nodes within the corresponding POA is available to the orchestration node 1130 that uses reinforcement learning to improve scheduling and planning functions from within the current network. In some embodiments, the parent DL 1110 serves as global finalization of all commits of observable events that persist the events in perpetuity and is available indefinitely for use by orchestration planning optimization based on reinforcement learning algorithms. However, in cases where dynamic re-planning is needed and where the finalization latency does not permit access to observable events in time and where the re-planning involves nodes in other edge operational domains (e.g., base stations in POA 1102 vs. regional offices in POA1104), the shared database 1128 allows faster finalization.

In an example embodiment, one or more of the edge devices within POA 1102 can be configured with an RLEPM, such as RLEPM 1134 performing RLEP management functions. For example, the RLEPM 1134 can schedule the execution of edge service instances in connection with an execution plan that is generated based on an SLA (e.g., generated by RLEPM 1132 of the orchestration node 1130). The RLEPM 1134 can store DL records as H records using the DL 1112 and telemetry data observations 1120. After an edge service instance is performed to complete a state transition, an updated DL record is generated and stored in the DL 1112 using the telemetry data observations 1120.

Similarly, one or more of the edge devices within POAs 1104-1108 can be configured with an RLEPM, such as RLEPMs 1136, 1138, and 1140 performing RLEP management functions. For example, RLEPMs 1136-1140 can schedule the execution of edge service instances in connection with an execution plan that is generated based on an SLA (e.g., generated by RLEPM 1132 of the orchestration node 1130). The RLEPMs 1136-1140 can store distributed ledger records as H records using the DLs 1114, 1116, 1118, and telemetry data observations 1122, 1124, and 126. After an edge service instance is performed to complete a state transition, an updated DL record is generated and stored in the DLs 1114-1118 using the telemetry data observations 1122, 1124, and 1126 respectively.

In some embodiments, each of the DLs 1120-1126 uses a consensus algorithm that generates commits (e.g., committed DL records) with the latency associated with the respective POAs 1102-1108 (e.g., latency at least an order of magnitude smaller in comparison to overall response time bounds for each tier—such as, 10 ms, 100 ms, 1 s, and 10 s respectively). The distributed ledger records that are committed in distributed ledger 1112 can also be communicated (or replicated) in the parent distributed ledger 1110 used by the RLEPM 1132. Since DL records that have been committed in a child DL become available at different latencies based on the POA the DL record originates, the DL records communicated to the parent DL 1110 will be finalized at the parent DL 1110 at different times (and therefore will be available for use by the RLEPM 1132 at different times). To facilitate the retrieval and generation of H records, in some embodiments, a common database 1142 including copies of telemetry data observations 1120-1126 can be used by the RLEPM 1132 in the orchestration node 1130. For example, RLEPM 1132 may evaluate the telemetry data observations stored in the common database 1142 (which are not available in finalized records in the DL 1110) and select an edge node for the execution of an edge service instance associated with a workload execution plan further based on the telemetry data observations in the common database 1142.

Figure 12:
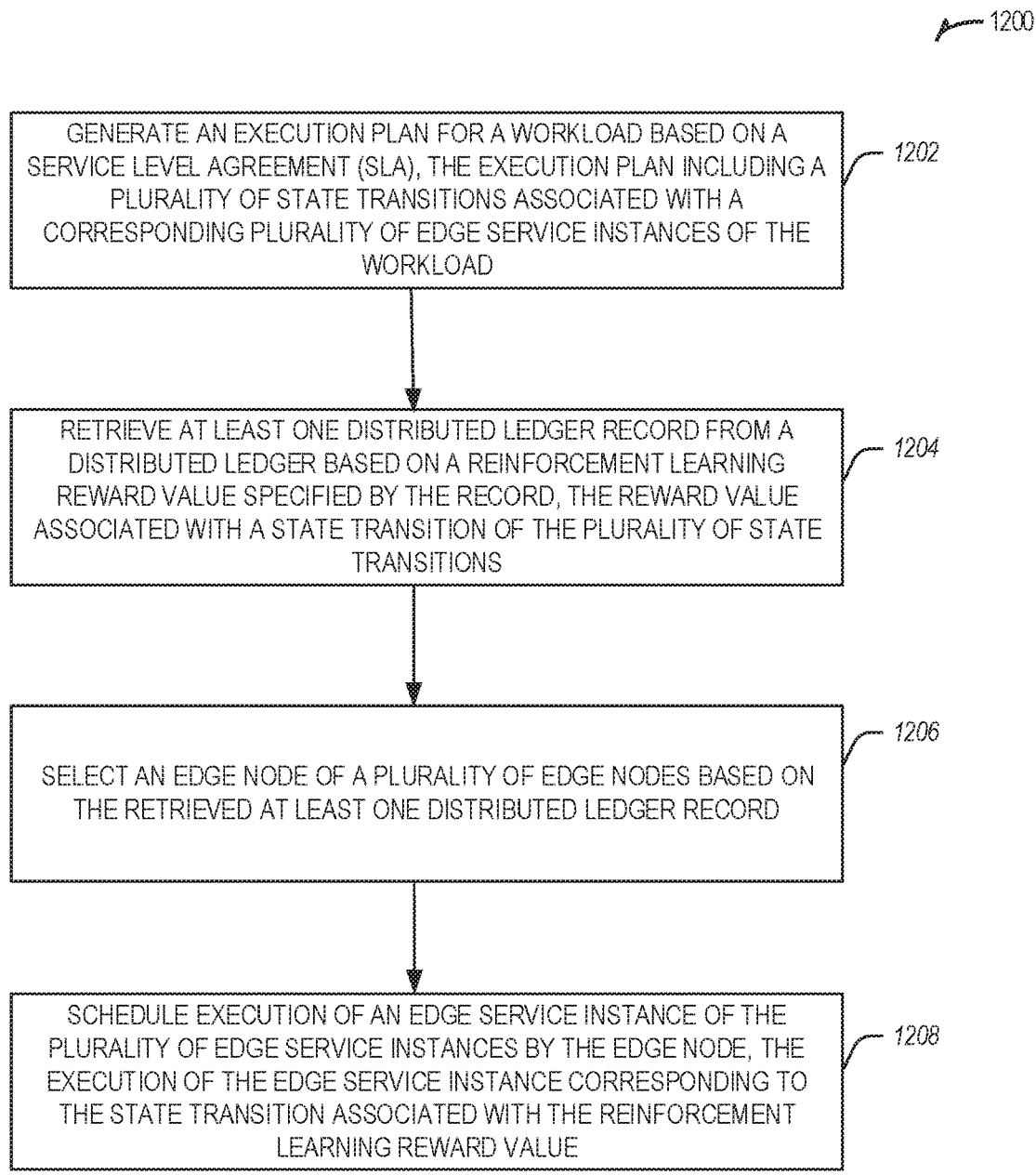
FIG. 12 is a flowchart of a method based on RLEP functions performed by an edge computing device.

FIG. 12 is a flowchart of a method 1200 based on RLEP functions performed by an edge computing device. The method 1200 can be performed by an RLEPM of a network management entity or another type of edge computing device discussed herein. At operation 1202, an execution plan (e.g., execution plan 1044) for a workload is generated based on an SLA (e.g., SLA1042 with KPIs 1043). The execution plan may include a plurality of state transitions (e.g., state transitions 1046, . . . , 1048) associated with a corresponding plurality of edge service instances (e.g., ESIs 1050, . . . , 1052) of the workload. At operation 1204, at least one distributed ledger record (e.g., DL record 1030) is retrieved from a distributed ledger (e.g., DL 1010) based on a reinforcement learning reward value (e.g., RLRV 1070) specified by the at least one distributed ledger record. The reinforcement learning reward value is associated with a state transition (e.g., state transition 1062 which can be one of the state transitions 1046, . . . , 1048) of the plurality of state transitions. At operation 1206, an edge node of a plurality of edge nodes is selected based on the retrieved at least one distributed ledger record. At operation 1206, execution of an edge service instance of the plurality of edge service instances by the edge node is scheduled. The execution of the edge service instance corresponds to the state transition associated with the reinforcement learning reward value.

In some embodiments, a state transition of the plurality of state transitions is associated with an edge service instance of the plurality of edge service instances, and the state transition indicates an initial processing state (e.g., state 1064) and a final processing state (e.g., state 1066) of data processed during the execution of the edge service instance. In some embodiments, a subset of distributed ledger records is selected from a plurality of available distributed ledger records stored in the distributed ledger (e.g., DL 1010), where each distributed ledger record in the subset including an indicator of the state transition. In some embodiments, the at least one distributed ledger record is selected from the subset of distributed ledger records based on a maximum reinforcement learning reward value of reinforcement learning reward values indicated by the subset of distributed ledger records.

In some embodiments, a confirmation from the edge node is decoded (or parsed/interpreted). The confirmation indicates execution of the edge service instance and completion of the state transition associated with the reinforcement learning reward value at a completion time t. In some embodiments, the confirmation further includes telemetry data observed at network resources of the edge node at the completion time t. In some embodiments, an updated reinforcement learning reward value is calculated based on a deviation of the telemetry data observed at the network resources of the edge node at the completion time t and KPIs (e.g., KPIs 1043) specified by the SLA and associated with the state transition. In some aspects, a new distributed ledger record is generated. The new distributed ledger record includes an identification of the edge node, an initial state and an end state of the state transition, the execution of the edge service instance corresponding to an action causing the state transition, and the telemetry data observed at the network resources of the edge node at the completion time t. The generated new distributed ledger record is stored in the distributed ledger.

In some embodiments, the distributed ledger is a parent distributed ledger in a hierarchy of distributed ledgers. The at least one distributed ledger record is retrieved from a plurality of available distributed ledger records stored in a child distributed ledger of a plurality of child distributed ledgers in the hierarchy of distributed ledgers. In some embodiments, a plurality of committed blocks is received from the plurality of child distributed ledgers in the hierarchy of distributed ledgers, each of the plurality of child distributed ledgers associated with a point of access (POA)

cluster of a plurality of available POA clusters of edge nodes. Each POA cluster of the plurality of POA clusters is associated with a preconfigured communication latency. In some embodiments, the plurality of committed blocks is stored as a plurality of available distributed ledger records in the parent distributed ledger.

In some embodiments, the workload is one of an audio stream encoding workload, an audio stream decoding workload, a video stream encoding workload, and a video stream decoding workload. The following additional workloads may be used as well: content delivery network (CDN) workload (CDN may be at the edge and data is cached at the edge; used resources include storage and CPUs); manufacturing workload (general AI interfacing models for industrial and real-time deployments; used resources include communication, CPUs, storage); video and video analytics workloads (live video analytics and video pre-processing and transcoding; use the resources include CPUs and storage); network function virtualization (NFV) workloads (flexible NFV processing; used resources include CPUs and storage); speech recognition workloads (speech-to-text processing, user commands, and biometric recognition; used resources include communication and CPUs); augmented reality/virtual reality (AR/VR) and gaming workloads (e.g., image processing and AIA for recognition and annotations, video transcoding, and rendering; used resources include CPUs and memory); ADAS and V2V/V2X workloads (assist in autonomous or non-autonomous driving infotainment; used resources include CPUs and storage); retail workloads (e.g., shops using storage and AI inferencing for enhanced in-shop user experience; online retailers using AI and analytics; ad bidding; used the resources include communication, CPUs, and storage); medical applications workloads (e.g., AI-based health analysis/inferencing and assisting medical appliances; used resources include CPUs, communication, and storage); and Smart cities and governments workloads (e.g., retail, banking, hospitality, education, and transportation; examples include surveillance, safety, healthcare, and other applications; used resources include CPUs, communication, and storage).

It should be understood that the functional units or capabilities described in this specification may have been referred to or labeled as components, circuits, or modules, to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field-programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

ADDITIONAL EXAMPLES AND ASPECTS

Example 1 is an orchestration system including memory storing a distributed ledger; and at least one processing circuitry coupled to the memory, the at least one processing circuitry configured to perform operations to generate an execution plan for a workload based on a Service Level Agreement (SLA), the execution plan comprising a plurality of state transitions associated with a corresponding plurality of edge service instances of the workload; retrieve at least one distributed ledger record from the distributed ledger based on a reinforcement learning reward value specified by the at least one distributed ledger record, the reinforcement learning reward value associated with a state transition of the plurality of state transitions; select an edge node of a plurality of edge nodes based on the retrieved at least one distributed ledger record; and schedule execution of an edge service instance of the plurality of edge service instances by the edge node, the execution of the edge service instance corresponding to the state transition associated with the reinforcement learning reward value.

In Example 2, the subject matter of Example 1 includes subject matter where a state transition of the plurality of state transitions is associated with an edge service instance of the plurality of edge service instances, and wherein the state transition indicates an initial processing state and a final processing state of data processed during execution of the edge service instance.

In Example 3, the subject matter of Example 2 includes subject matter where the at least one processing circuitry is further configured to perform operations to select a subset of distributed ledger records from a plurality of available distributed ledger records stored in the distributed ledger, each distributed ledger record in the subset including an indicator of the state transition.

In Example 4, the subject matter of Example 3 includes subject matter where the at least one processing circuitry is further configured to perform operations to select the at least one distributed ledger record from the subset of distributed ledger records based on a maximum reinforcement learning reward value of reinforcement learning reward values indicated by the subset of distributed ledger records.

In Example 5, the subject matter of Examples 2-4 includes subject matter where the at least one processing circuitry is further configured to perform operations to decode (or parse/interpret) a confirmation from the edge node, the confirmation indicating execution of the edge service instance and completion of the state transition associated with the reinforcement learning reward value at a completion time t.

In Example 6, the subject matter of Example 5 includes subject matter where the confirmation further includes telemetry data observed at network resources of the edge node at the completion time t.

In Example 7, the subject matter of Example 6 includes subject matter where the at least one processing circuitry is further configured to perform operations to calculate an updated reinforcement learning reward value based on a deviation of the telemetry data observed at the network resources of the edge node at the completion time t and key performance indicators (KPIs) specified by the SLA and associated with the state transition.

In Example 8, the subject matter of Example 7 includes subject matter where the at least one processing circuitry is further configured to perform operations to generate a new distributed ledger record, the new distributed ledger record including an identification of the edge node, the updated reinforcement learning reward value, the initial processing state and the final processing state of the state transition, the execution of the edge service instance corresponding to an action causing the state transition, and the telemetry data observed at the network resources of the edge node at the completion time t; and store the generated new distributed ledger record in the distributed ledger.

In Example 9, the subject matter of Examples 2-8 includes subject matter where the distributed ledger is a parent distributed ledger in a hierarchy of distributed ledgers, and wherein the at least one processing circuitry is further configured to perform operations to retrieve the at least one distributed ledger record from a plurality of available distributed ledger records stored in a child distributed ledger of a plurality of child distributed ledgers in the hierarchy of distributed ledgers.

In Example 10, the subject matter of Example 9 includes subject matter where the at least one processing circuitry is further configured to perform operations to receive a plurality of committed blocks from the plurality of child distributed ledgers in the hierarchy of distributed ledgers, each of the plurality of child distributed ledgers associated with a point of access (POA) cluster of a plurality of available POA clusters of edge nodes, wherein each POA cluster of the plurality of POA clusters is associated with a preconfigured communication latency.

In Example 11, the subject matter of Example 10 includes subject matter where the at least one processing circuitry is further configured to perform operations to store the plurality of committed blocks as a plurality of available distributed ledger records in the parent distributed ledger.

In Example 12, the subject matter of Examples 1-11 includes subject matter where the workload is one of an audio stream encoding workload; an audio stream decoding workload; a video stream encoding workload; and a video stream decoding workload.

In Example 13, the subject matter of Examples 1-12 includes subject matter where the at least one processing circuitry is within one of an Edge-as-a-Service (EaaS) edge orchestrator node or EaaS meta-orchestrator node.

Example 14 is a non-transitory machine-readable storage medium comprising instructions, wherein the instructions, when executed by a processing circuitry of an orchestration system, cause the processing circuitry to perform operations that: generate an execution plan for a workload based on a Service Level Agreement (SLA), the execution plan comprising a plurality of state transitions associated with a corresponding plurality of edge service instances of the workload; retrieve at least one distributed ledger record from a distributed ledger based on a reinforcement learning reward value specified by the at least one distributed ledger record, the reinforcement learning reward value associated with a state transition of the plurality of state transitions; select an edge node of a plurality of edge nodes based on the retrieved at least one distributed ledger record; and schedule execution of an edge service instance of the plurality of edge service instances by the edge node, the execution of the edge service instance corresponding to the state transition associated with the reinforcement learning reward value.

In Example 15, the subject matter of Example 14 includes subject matter where a state transition of the plurality of state transitions is associated with an edge service instance of the plurality of edge service instances, and wherein the state transition indicates an initial processing state and a final processing state of data processed during execution of the edge service instance.

In Example 16, the subject matter of Example 15 includes subject matter where the instructions further cause the processing circuitry to perform operations that: select a subset of distributed ledger records from a plurality of available distributed ledger records stored in the distributed ledger, each distributed ledger record in the subset including an indicator of the state transition.

In Example 17, the subject matter of Example 16 includes subject matter where the instructions further cause the processing circuitry to perform operations that: select the at least one distributed ledger record from the subset of distributed ledger records based on a maximum reinforcement learning reward value of reinforcement learning reward values indicated by the subset of distributed ledger records.

In Example 18, the subject matter of Examples 14-17 includes subject matter where the instructions further cause the processing circuitry to perform operations that: decode (or parse) a confirmation from the edge node, the confirmation indicating execution of the edge service instance and completion of the state transition associated with the reinforcement learning reward value at a completion time t.

In Example 19, the subject matter of Example 18 includes subject matter where the confirmation further includes telemetry data observed at network resources of the edge node at the completion time t.

In Example 20, the subject matter of Example 19 includes subject matter where the instructions further cause the processing circuitry to perform operations that: calculate an updated reinforcement learning reward value based on a deviation of the telemetry data observed at the network resources of the edge node at the completion time t and key performance indicators (KPIs) specified by the SLA and associated with the state transition.

In Example 21, the subject matter of Example 20 includes subject matter where the instructions further cause the processing circuitry to perform operations that: generate a new distributed ledger record, the new distributed ledger record including an identification of the edge node, an initial state and an end state of the state transition, the edge service instance corresponding to an action causing the state transition, and the telemetry data observed at the network resources of the edge node at the completion time t; and store the generated new distributed ledger record in the distributed ledger.

In Example 22, the subject matter of Examples 15-21 includes subject matter where the distributed ledger is a parent distributed ledger in a hierarchy of distributed ledgers, and wherein the instructions further cause the processing circuitry to perform operations that: retrieve the at least one distributed ledger record from a plurality of available distributed ledger records stored in a child distributed ledger of a plurality of child distributed ledgers in the hierarchy of distributed ledgers.

In Example 23, the subject matter of Example 22 includes subject matter where the instructions further cause the processing circuitry to perform operations that: receive a plurality of committed blocks from the plurality of child distributed ledgers in the hierarchy of distributed ledgers, each of the plurality of child distributed ledgers associated with a point of access (POA) cluster of a plurality of available POA clusters of edge nodes, wherein each POA cluster of the plurality of POA clusters is associated with a preconfigured communication latency.

In Example 24, the subject matter of Example 23 includes subject matter where the instructions further cause the processing circuitry to perform operations that: store the plurality of committed blocks as a plurality of available distributed ledger records in the parent distributed ledger.

In Example 25, the subject matter of Examples 14-24 includes subject matter where the workload is one of an audio stream encoding workload; an audio stream decoding workload; a video stream encoding workload; and a video stream decoding workload.

In Example 26, the subject matter of Examples 14-25 includes subject matter where the processing circuitry is within one of an Edge-as-a-Service (EaaS) edge orchestrator node or EaaS meta-orchestrator node.

Example 27 is a method performed by a network management device operable in an edge computing system, the method comprising: generating an execution plan for a workload based on a Service Level Agreement (SLA), the execution plan comprising a plurality of state transitions associated with a corresponding plurality of edge service instances of the workload; retrieving at least one distributed ledger record from a distributed ledger based on a reinforcement learning reward value specified by the at least one distributed ledger record, the reinforcement learning reward value associated with a state transition of the plurality of state transitions; selecting an edge node of a plurality of edge nodes based on the retrieved at least one distributed ledger record; and scheduling execution of an edge service instance of the plurality of edge service instances by the edge node, the execution of the edge service instance corresponding to the state transition associated with the reinforcement learning reward value.

In Example 28, the subject matter of Example 27 includes subject matter where a state transition of the plurality of state transitions is associated with an edge service instance of the plurality of edge service instances, and wherein the state transition indicates an initial processing state and a final processing state of data processed during execution of the edge service instance.

In Example 29, the subject matter of Example 28 includes, selecting a subset of distributed ledger records from a plurality of available distributed ledger records stored in the distributed ledger, each distributed ledger record in the subset including an indicator of the state transition.

In Example 30, the subject matter of Example 29 includes, selecting the at least one distributed ledger record from the subset of distributed ledger records based on a maximum reinforcement learning reward value of reinforcement learning reward values indicated by the subset of distributed ledger records.

In Example 31, the subject matter of Examples 27-30 includes, decoding a confirmation from the edge node, the confirmation indicating execution of the edge service instance, and completion of the state transition associated with the reinforcement learning reward value at a completion time t.

In Example 32, the subject matter of Example 31 includes subject matter where the confirmation further includes telemetry data observed at network resources of the edge node at the completion time t.

In Example 33, the subject matter of Example 32 includes, calculating an updated reinforcement learning reward value based on a deviation of the telemetry data observed at the network resources of the edge node at the completion time t and key performance indicators (KPIs) specified by the SLA and associated with the state transition.

In Example 34, the subject matter of Example 33 includes, generating a new distributed ledger record, the new distributed ledger record including an identification of the edge node, an initial state and an end state of the state transition, the edge service instance corresponding to an action causing the state transition, and the telemetry data observed at the network resources of the edge node at the completion time t; and storing the generated new distributed ledger record in the distributed ledger.

In Example 35, the subject matter of Examples 28-34 includes subject matter where the distributed ledger is a parent distributed ledger in a hierarchy of distributed ledgers, and wherein the method further comprises: retrieving the at least one distributed ledger record from a plurality of available distributed ledger records stored in a child distributed ledger of a plurality of child distributed ledgers in the hierarchy of distributed ledgers.

In Example 36, the subject matter of Example 35 includes, receiving a plurality of committed blocks from the plurality of child distributed ledgers in the hierarchy of distributed ledgers, each of the plurality of child distributed ledgers associated with a point of access (POA) cluster of a plurality of available POA clusters of edge nodes, wherein each POA cluster of the plurality of POA clusters is associated with a preconfigured communication latency.

In Example 37, the subject matter of Example 36 includes, storing the plurality of committed blocks as a plurality of available distributed ledger records in the parent distributed ledger.

In Example 38, the subject matter of Examples 27-37 includes subject matter where the workload is one of an audio stream encoding workload; an audio stream decoding workload; a video stream encoding workload; and a video stream decoding workload.

Example 39 is an edge computing device operable in an edge computing system, the edge computing device comprising: a network interface card (NIC); and processing circuitry coupled to the NIC, the processing circuitry configured to perform operations to: decode (or parse) configuration information received via the NIC from an orchestration device, the configuration information to schedule execution of an edge service instance of a plurality of edge service instances associated with an execution plan for a workload, the execution plan based on a Service Level Agreement (SLA); perform the execution of the edge service instance, the execution causing a state transition between an initial processing state and a final processing state of data associated with the workload; and encode a confirmation for transmission via the NIC to the orchestration device, the confirmation indicating completion of the state transition at a completion time t and including telemetry data observed at network resources of the edge computing device at the completion time t.

In Example 40, the subject matter of Example 39 includes subject matter where the processing circuitry is configured to perform operations to calculate a reinforcement learning reward value based on a deviation of the telemetry data observed at the network resources of the edge computing device at the completion time t and key performance indicators (KPIs) specified by the SLA associated with the execution plan.

In Example 41, the subject matter of Example 40 includes subject matter where the processing circuitry is configured to perform operations to generate a distributed ledger record, the distributed ledger record including an identification of the edge computing device, a state transition including the initial processing state and the final processing state, the edge service instance corresponding to an action causing the state transition, and the telemetry data observed at the completion time t.

In Example 42, the subject matter of Example 41 includes subject matter where the processing circuitry is configured to perform operations to store the generated distributed ledger record in a distributed ledger, wherein the distributed ledger is a child distributed ledger in a hierarchy of distributed ledgers within the edge computing system.

In Example 43, the subject matter of Examples 39-42 includes subject matter where the execution plan comprises a plurality of state transitions associated with the plurality of edge service instances of the workload.

Example 44 is a non-transitory machine-readable storage medium comprising instructions, wherein the instructions, when executed by a processing circuitry of an edge computing device operable in an edge computing system, cause the processing circuitry to perform operations that: decode (or parse) configuration information received from an orchestration device, the configuration information to schedule execution of an edge service instance of a plurality of edge service instances associated with an execution plan for a workload, the execution plan based on a Service Level Agreement (SLA); perform the execution of the edge service instance, the execution causing a state transition between an initial processing state and a final processing state of data associated with the workload; and encode a confirmation for transmission to the orchestration device, the confirmation indicating completion of the state transition at a completion time t and including telemetry data observed at network resources of the edge computing device at the completion time t.

In Example 45, the subject matter of Example 44 includes subject matter where the instructions further cause the processing circuitry to perform operations that: calculate a reinforcement learning reward value based on a deviation of the telemetry data observed at the network resources of the edge computing device at the completion time t and key performance indicators (KPIs) specified by the SLA associated with the execution plan.

In Example 46, the subject matter of Example 45 includes subject matter where the instructions further cause the processing circuitry to perform operations that: generate a distributed ledger record, the distributed ledger record including an identification of the edge computing device, a state transition including the initial processing state and the final processing state, the edge service instance corresponding to an action causing the state transition, and the telemetry data observed at the completion time t.

In Example 47, the subject matter of Example 46 includes subject matter where the instructions further cause the processing circuitry to perform operations that: store the generated distributed ledger record in a distributed ledger, wherein the distributed ledger is a child distributed ledger in a hierarchy of distributed ledgers within the edge computing system.

In Example 48, the subject matter of Examples 44-47 includes subject matter where the execution plan comprises a plurality of state transitions associated with the plurality of edge service instances of the workload.

Example 49 is a method performed by an edge computing device operable in an edge computing system, the method comprising: decoding configuration information received from an orchestration device, the configuration information to schedule the execution of an edge service instance of a plurality of edge service instances associated with an execution plan for a workload, the execution plan based on a Service Level Agreement (SLA); executing the edge service instance, the execution causing a state transition between an initial processing state and a final processing state of data associated with the workload; and encoding a confirmation for transmission to the orchestration device, the confirmation indicating completion of the state transition at a completion time t and including telemetry data observed at network resources of the edge computing device at the completion time t.

In Example 50, the subject matter of Example 49 includes, calculating a reinforcement learning reward value based on a deviation of the telemetry data observed at the network resources of the edge computing device at the completion time t and key performance indicators (KPIs) specified by the SLA associated with the execution plan.

In Example 51, the subject matter of Example 50 includes, generating a distributed ledger record, the distributed ledger record including an identification of the edge computing device, a state transition including the initial processing state and the final processing state, the execution of the edge service instance corresponding to an action causing the state transition, and the telemetry data observed at the completion time t.

In Example 52, the subject matter of Example 51 includes, storing the generated distributed ledger record in a distributed ledger, wherein the distributed ledger is a child distributed ledger in a hierarchy of distributed ledgers within the edge computing system.

In Example 53, the subject matter of Examples 49-52 includes subject matter where the execution plan comprises a plurality of state transitions associated with the plurality of edge service instances of the workload.

Example 54 is at least one machine-readable medium including instructions that, when executed by processing circuitry, cause the processing circuitry to perform operations to implement of any of Examples 1-53.

Example 55 is an apparatus comprising means to implement of any of Examples 1-53.

Example 56 is a system to implement of any of Examples 1-53.

Example 57 is a method to implement of any of Examples 1-53.

Example 58 is a computer program used in an edge computing system, the computer program comprising instructions, wherein execution of the program by a processing element in the edge computing system is to cause the processing element to perform any of the methods of Examples 1-53.

Example 59 is an edge computing appliance device operating as a self-contained processing system, comprising a housing, case or shell, network communication circuitry, storage memory circuitry, and processor circuitry, adapted to perform any of the methods of Examples 1-53.

Example 60 is an apparatus of an edge computing system comprising means to perform any of the methods of Examples 1-53.

Example 63 is an apparatus of an edge computing system comprising logic, modules, or circuitry to perform any of the methods of Examples 1-53.

Another example implementation is an edge computing system, including respective edge processing devices and nodes to invoke or perform the operations of Examples 1-53, or other subject matter described herein.

Another example implementation is a client endpoint node, operable to invoke or perform the operations of Examples 1-53, or other subject matter described herein.

Another example implementation is an aggregation node, network hub node, gateway node, or core data processing node, within or coupled to an edge computing system, operable to invoke or perform the operations of Examples 1-53, or other subject matter described herein.

Another example implementation is an access point, base station, road-side unit, street-side unit, or on-premise unit, within or coupled to an edge computing system, operable to invoke or perform the operations of Examples 1-53, or other subject matter described herein.

Another example implementation is an edge provisioning node, service orchestration node, application orchestration node, or multi-tenant management node, within or coupled to an edge computing system, operable to invoke or perform the operations of Examples 1-53, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of Examples 1-53, or other subject matter described herein.

Another example implementation is an edge computing system including aspects of network functions, acceleration functions, acceleration hardware, storage hardware, or computation hardware resources, operable to invoke or perform the use cases discussed herein, with use of Examples 1-53, or other subject matter described herein.

Another example implementation is an edge computing system adapted for supporting client mobility, vehicle-to-vehicle (V2V), vehicle-to-everything (V2X), or vehicle-to-infrastructure (V2I) scenarios, and optionally operating according to European Telecommunications Standards Institute (ETSI) Multi-Access Edge Computing (MEC) specifications, operable to invoke or perform the use cases discussed herein, with use of Examples 1-53, or other subject matter described herein.

Another example implementation is an edge computing system adapted for mobile wireless communications, including configurations according to a 3GPP 4G/LTE or 5G network capabilities, operable to invoke or perform the use cases discussed herein, with use of Examples 1-53, or other subject matter described herein.

Another example implementation is an edge computing node, operable in a layer of an edge computing network or edge computing system as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, operable to invoke or perform the use cases discussed herein, with use of Examples 1-53, or other subject matter described herein.

Another example implementation is networking hardware, acceleration hardware, storage hardware, or computation hardware, with capabilities implemented thereupon, operable in an edge computing system to invoke or perform the use cases discussed herein, with use of Examples 1-53, or other subject matter described herein.

Another example implementation is an edge computing system configured to perform use cases provided from one or more of: compute offload, data caching, video processing, network function virtualization, radio access network management, augmented reality, virtual reality, industrial automation, retail services, manufacturing operations, smart buildings, energy management, autonomous driving, vehicle assistance, vehicle communications, internet of things operations, object detection, speech recognition, healthcare applications, gaming applications, or accelerated content processing, with use of Examples 1-53, or other subject matter described herein.

Another example implementation is an apparatus of an edge computing system comprising: one or more processors and one or more computer-readable media comprising instructions that, when executed by the one or more processors, cause the one or more processors to invoke or perform the use cases discussed herein, with use of Examples 1-53, or other subject matter described herein.

Another example implementation is one or more computer-readable storage media comprising instructions to cause an electronic device of an edge computing system, upon execution of the instructions by one or more processors of the electronic device, to invoke or perform the use cases discussed herein, with use of Examples 1-53, or other subject matter described herein.

Another example implementation is an apparatus of an edge computing system comprising means, logic, modules, or circuitry to invoke or perform the use cases discussed herein, with the use of Examples 1-53, or other subject matter described herein.

Although these implementations have been described with reference to specific exemplary aspects, it will be evident that various modifications and changes may be made to these aspects without departing from the broader scope of the present disclosure. Many of the arrangements and processes described herein can be used in combination or parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is disclosed. Thus, although specific aspects have been illustrated and described herein, it should be appreciated that any arrangement calculated to achieve the same purpose may be substituted for the specific aspects shown. This disclosure is intended to cover any adaptations or variations of various aspects. Combinations of the above aspects and other aspects not specifically described herein will be apparent to those of skill in the art upon reviewing the above description.

What is claimed is:

1. An orchestration system comprising:
memory storing a distributed ledger; and
at least one processing circuitry coupled to the memory, the at least one processing circuitry configured to perform operations to:
generate an execution plan for a workload, the execution plan comprising a plurality of processing states associated with a corresponding plurality of edge service instances of the workload;
retrieve at least one distributed ledger record from the distributed ledger based on a reinforcement learning reward value specified by the at least one distributed ledger record, the reinforcement learning reward value associated with a processing state of the plurality of processing states;
select an edge node of a plurality of edge nodes based on the retrieved at least one distributed ledger record; and
schedule execution of an edge service instance of the plurality of edge service instances by the edge node, the execution of the edge service instance corresponding to the processing state associated with the reinforcement learning reward value,
wherein the processing state of the plurality of processing states is associated with an edge service instance of the plurality of edge service instances, wherein the distributed ledger is a parent distributed ledger in a hierarchy of distributed ledgers, and wherein the at least one processing circuitry is further configured to perform operations to retrieve the at least one distributed ledger record from a plurality of available distributed ledger records stored in a child distributed ledger of a plurality of child distributed ledgers in the hierarchy of distributed ledgers.

2. The orchestration system of claim 1, wherein the processing state indicates at least one of an initial processing state and a final processing state of data processed during execution of the edge service instance.

3. The orchestration system of claim 2, wherein the at least one processing circuitry is further configured to perform operations to:
select a subset of distributed ledger records from a plurality of available distributed ledger records stored in the distributed ledger, each distributed ledger record in the subset including an indicator of the processing state.

4. The orchestration system of claim 3, wherein the at least one processing circuitry is further configured to perform operations to:
select the at least one distributed ledger record from the subset of distributed ledger records based on a maximum reinforcement learning reward value of reinforcement learning reward values indicated by the subset of distributed ledger records.

5. The orchestration system of claim 2, wherein the at least one processing circuitry is further configured to perform operations to:
parse a confirmation from the edge node, the confirmation indicating an execution of the edge service instance, and a completion of the processing state associated with the reinforcement learning reward value at a completion time t.

6. The orchestration system of claim 5, wherein the confirmation further includes telemetry data observed at network resources of the edge node at the completion time t.

7. The orchestration system of claim 6, wherein the at least one processing circuitry is further configured to perform operations to:
calculate an updated reinforcement learning reward value based on a deviation of the telemetry data observed at the network resources of the edge node at the completion time t and key performance indicators (KPIs) specified by the execution plan and associated with the processing state.

8. The orchestration system of claim 7, wherein the at least one processing circuitry is further configured to perform operations to:
generate a new distributed ledger record, the new distributed ledger record including an identification of the edge node, the updated reinforcement learning reward value, at least one of the initial processing state and the final processing state, the edge service instance corresponding to an action associated with the processing state, and the telemetry data observed at the network resources of the edge node at the completion time t; and
store the generated new distributed ledger record in the distributed ledger.

9. The orchestration system of claim 1, wherein the at least one processing circuitry is further configured to perform operations to:
receive a plurality of committed blocks from the plurality of child distributed ledgers in the hierarchy of distributed ledgers, each of the plurality of child distributed ledgers associated with a point of access (POA) cluster of a plurality of available POA clusters of edge nodes, wherein each POA cluster of the plurality of POA clusters is associated with a preconfigured communication latency.

10. The orchestration system of claim 9, wherein the at least one processing circuitry is further configured to perform operations to:
store the plurality of committed blocks as a plurality of available distributed ledger records in the parent distributed ledger.

11. The orchestration system of claim 1, wherein the workload is one of:
an audio stream encoding workload;
an audio stream decoding workload;
a video stream encoding workload; and
a video stream decoding workload.

12. The orchestration system of claim 1, wherein the at least one processing circuitry is within one of an Edge-as-a-Service (EaaS) edge orchestrator node or EaaS meta-orchestrator node.

13. A non-transitory machine-readable storage medium comprising instructions, wherein the instructions, when executed by processing circuitry of an orchestration system, cause the processing circuitry to perform operations that:

generate an execution plan for a workload, the execution plan comprising a plurality of processing states associated with a corresponding plurality of edge service instances of the workload;

retrieve at least one distributed ledger record from the distributed ledger based on a reinforcement learning reward value specified by the at least one distributed ledger record, the reinforcement learning reward value associated with a processing state of the plurality of processing states;

select an edge node of a plurality of edge nodes based on the retrieved at least one distributed ledger record; and schedule execution of an edge service instance of the plurality of edge service instances by the edge node, the execution of the edge service instance corresponding to the processing state associated with the reinforcement learning reward value, wherein the processing state of the plurality of processing states is associated with an edge service instance of the plurality of edge service instances, wherein the distributed ledger is a parent distributed ledger in a hierarchy of distributed ledgers, and wherein the at least one processing circuitry is further configured to perform operations to retrieve the at least one distributed ledger record from a plurality of available distributed ledger records stored in a child distributed ledger of a plurality of child distributed ledgers in the hierarchy of distributed ledgers.

14. The machine-readable storage medium of claim 13, wherein the processing state of the plurality of processing states is associated with an edge service instance of the plurality of edge service instances, and wherein the processing state indicates at least one of an initial processing state and a final processing state of data processed during execution of the edge service instance.

15. The machine-readable storage medium of claim 14, wherein the instructions further cause the processing circuitry to perform operations that:

select a subset of distributed ledger records from a plurality of available distributed ledger records stored in the distributed ledger, each distributed ledger record in the subset including an indicator of the processing state.

16. The machine-readable storage medium of claim 15, wherein the instructions further cause the processing circuitry to perform operations that:

select the at least one distributed ledger record from the subset of distributed ledger records based on a maximum reinforcement learning reward value of reinforcement learning reward values indicated by the subset of distributed ledger records.

17. The machine-readable storage medium of claim 14, wherein the instructions further cause the processing circuitry to perform operations that:

parse a confirmation from the edge node, the confirmation indicating an execution of the edge service instance, and completion of the processing state associated with the reinforcement learning reward value at a completion time t.

18. The machine-readable storage medium of claim 17, wherein the confirmation further includes telemetry data observed at network resources of the edge node at the completion time t.

19. The machine-readable storage medium of claim 18, wherein the instructions further cause the processing circuitry to perform operations that:

calculate an updated reinforcement learning reward value based on a deviation of the telemetry data observed at the network resources of the edge node at the completion time t and key performance indicators (KPIs) specified by the execution plan and associated with the processing state.

20. The machine-readable storage medium of claim 19, wherein the instructions further cause the processing circuitry to perform operations that:

generate a new distributed ledger record, the new distributed ledger record including an identification of the edge node, the updated reinforcement learning reward value, at least one of the initial processing state and the final processing state, the edge service instance corresponding to an action associated with the processing state, and the telemetry data observed at the network resources of the edge node at the completion time t; and store the generated new distributed ledger record in the distributed ledger.

21. A method performed by a network management device operable in an edge computing system, the method comprising:

generating an execution plan for a workload, the execution plan comprising a plurality of processing states associated with a corresponding plurality of edge service instances of the workload;

retrieving at least one distributed ledger record from the distributed ledger based on a reinforcement learning reward value specified by the at least one distributed ledger record, the reinforcement learning reward value associated with a processing state of the plurality of processing states;

selecting an edge node of a plurality of edge nodes based on the retrieved at least one distributed ledger record; and scheduling execution of an edge service instance of the plurality of edge service instances by the edge node, the execution of the edge service instance corresponding to the processing state associated with the reinforcement learning reward value, wherein the processing state of the plurality of processing states is associated with an edge service instance of the plurality of edge service instances, wherein the distributed ledger is a parent distributed ledger in a hierarchy of distributed ledgers, and wherein the method further comprises retrieving the at least one distributed ledger record from a plurality of available distributed ledger records stored in a child distributed ledger of a plurality of child distributed ledgers in the hierarchy of distributed ledgers.

22. The method of claim 21, wherein the processing state of the plurality of processing states is associated with an edge service instance of the plurality of edge service instances, and wherein the processing state indicates at least one of an initial processing state and a final processing state of data processed during execution of the edge service instance.

23. The method of claim 22, further comprising:

selecting a subset of distributed ledger records from a plurality of available distributed ledger records stored in the distributed ledger, each distributed ledger record in the subset including an indicator of the processing state.

24. The method of claim 23, further comprising:
selecting the at least one distributed ledger record from the subset of distributed ledger records based on a maximum reinforcement learning reward value of reinforcement learning reward values indicated by the subset of distributed ledger records.

* * * * *